(12) United States Patent
Yang et al.

(10) Patent No.: US 10,744,748 B2
(45) Date of Patent: Aug. 18, 2020

(54) MICRO NANOPOROUS MEMBRANE, PREPARING METHOD THEREOF AND MICROFLUIDIC DEVICE USING THEREOF

(71) Applicant: THE INDUSTRY & ACADEMIC COOPERATION IN CHUNGNAM NATIONAL UNIVERSITY (IAC), Daejeon (KR)

(72) Inventors: Sung-Yun Yang, Daejeon (KR); Woo-Jin Joe, Daejeon (KR); Jeong-Hun Lee, Chungcheongnam-do (KR); Yun-Hee Jang, Gyeonggi-do (KR)

(73) Assignee: THE INDUSTRY & ACADEMIC COOPERATION IN CHUNGNAM NATIONAL UNIVERSITY (IAC), Daejeon (KR)

( * ) Notice: Subject to any disclaimer, the term of this patent is extended or adjusted under 35 U.S.C. 154(b) by 305 days.

(21) Appl. No.: 15/444,901

(22) Filed: Feb. 28, 2017

(65) Prior Publication Data
US 2017/0274377 A1    Sep. 28, 2017

(30) Foreign Application Priority Data

Feb. 29, 2016 (KR) .................. 10-2016-0024190
Feb. 24, 2017 (KR) .................. 10-2017-0024599

(51) Int. Cl.
*B32B 27/28* (2006.01)
*B01L 3/00* (2006.01)
(Continued)

(52) U.S. Cl.
CPC .......... *B32B 27/285* (2013.01); *B01D 67/003* (2013.01); *B01D 69/02* (2013.01);
(Continued)

(58) Field of Classification Search
CPC ...... C08J 9/26; C08J 2355/00; C08J 2455/00; C08J 2351/08; C08J 2451/08;
(Continued)

(56) References Cited

U.S. PATENT DOCUMENTS

| 2002/0098341 A1* | 7/2002 | Schiffer | C08J 5/18 428/323 |
| 2010/0040883 A1* | 2/2010 | McCarthy | A61K 9/1075 428/403 |
| 2015/0045206 A1* | 2/2015 | Tsapatsis | C01B 39/026 502/62 |

FOREIGN PATENT DOCUMENTS

| KR | 10-2015-0090565 A | 8/2015 |
| KR | 20150090565 A * | 8/2015 |
| WO | WO 2015/140355 A1 | 9/2015 |

OTHER PUBLICATIONS

Office action dated Mar. 30, 2018 from Korean Patent Office in a counterpart Korean Patent Application No. 10-2017-0024599 (all the cited references are listed in this IDS.) (English translation is also submitted herewith).

* cited by examiner

*Primary Examiner* — Vishal V Vasisth
(74) *Attorney, Agent, or Firm* — The PL Law Group, PLLC

(57) ABSTRACT

A method for preparing a nanoporous membrane includes alternatively repeating, on the surface of a porous substrate, the laminating of a hydrophilic homopolymer and the laminating of an amphiphilic block or graft copolymer to provide a polymer multilayer film in which the alternative laminate of the hydrophilic homopolymer and the amphiphilic block or graft copolymer is formed. The polymer multilayer film is annealed to form a microphase separated polymeric membrane. The laminating of a hydrophilic homopolymer
(Continued)

and the laminating of a supramolecular structure compound are alternatively repeated, on the surface of the polymeric membrane, to form the alternative laminate of the hydrophilic homopolymer and the supramolecular structure compound.

11 Claims, 17 Drawing Sheets

(51) Int. Cl.
| | |
|---|---|
| *B32B 37/06* | (2006.01) |
| *B32B 37/14* | (2006.01) |
| *B01D 69/12* | (2006.01) |
| *B01D 67/00* | (2006.01) |
| *B01D 71/52* | (2006.01) |
| *B01D 71/26* | (2006.01) |
| *B01D 71/40* | (2006.01) |
| *B32B 27/08* | (2006.01) |
| *B32B 27/30* | (2006.01) |
| *B32B 27/32* | (2006.01) |
| *B01D 69/02* | (2006.01) |
| *B01D 71/28* | (2006.01) |
| *B01D 65/08* | (2006.01) |
| *B01D 71/64* | (2006.01) |
| *B01D 71/02* | (2006.01) |
| *B01D 71/08* | (2006.01) |

(52) U.S. Cl.
CPC .............. *B01D 69/12* (2013.01); *B01D 71/26* (2013.01); *B01D 71/40* (2013.01); *B01D 71/52* (2013.01); *B01L 3/502753* (2013.01); *B32B 27/08* (2013.01); *B32B 27/308* (2013.01); *B32B 27/32* (2013.01); *B32B 37/06* (2013.01); *B32B 37/14* (2013.01); *B01D 65/08* (2013.01); *B01D 71/028* (2013.01); *B01D 71/08* (2013.01); *B01D 71/28* (2013.01); *B01D 71/64* (2013.01); *B01D 2325/36* (2013.01); *B01L 2300/0681* (2013.01); *B01L 2300/0896* (2013.01); *B01L 2300/161* (2013.01); *B32B 2250/42* (2013.01); *B32B 2305/026* (2013.01); *B32B 2307/726* (2013.01); *B32B 2307/728* (2013.01); *B32B 2307/73* (2013.01)

(58) Field of Classification Search
CPC .............. C08J 2305/16; C08J 2405/16; B01L 3/502707; B01L 3/502753; B01L 2300/0681; B01L 2200/12; B01L 2300/0887; B01L 2300/161; B32B 37/06; B32B 37/14; B32B 27/08; B32B 27/308; B32B 27/32; B32B 27/285; B32B 2305/026; B32B 2250/42; B32B 2307/728; B32B 2307/73; B32B 2307/726; B01D 69/12; B01D 67/003; B01D 71/78; B01D 71/80; B01D 71/52; B01D 71/26; B01D 71/40; B01D 69/141; B01D 2323/36; B01D 2325/36; B01D 2325/38

See application file for complete search history.

NMR spectra of (a)PEAA (b)PEAA-g-PEG

MICRO NANOPOROUS MEMBRANE, PREPARING METHOD THEREOF AND MICROFLUIDIC DEVICE USING THEREOF

CROSS-REFERENCE OF RELATED APPLICATIONS

The present application claims priorities to Korean Patent Application No. 2016-0024190 filed on Feb. 29, 2016 with the Korean Intellectual Property Office (KIPO) and Korean Patent Application No. 2017-0024599 filed on Feb. 24, 2017 with the KIPO, which applications are incorporated herein by reference in their entirety.

BACKGROUND

Technical Field

The present invention relates to a nanoporous membrane, a preparing method thereof and a microfluidic device using the same, and more specifically, to a multi combination-deformable nanoporous membrane with excellent biofouling resistance by the formation of nano pores using the self-assembly and molecular recognition phenomenon of a polymer composite material, and a microfluidic device using the same.

BACKGROUND TECHNOLOGY OF THE INVENTION

The microfluidic system is commonly known to mean the technology that enables analysis, synthesis, etc. by using a small amount of specimens as a device that deals with fluid in a micron scale. After in early 1990, this system was proposed as a micro total analysis system (µTAS), this system has formed the new field of sensors as a system capable of performing pre-treatment, analysis and detection of specimens using one device while reducing the consumption amounts of a carrier, specimens, mobility, etc. by the extreme miniaturization as compared to conventional chromatography methods. Lab-on-a-chip, which was proposed in late 1990 as the other application field of the microfluidic system, is to integrate on one chip nano or micro devices having the function of traditional unit operations such as mixing, separating, heating, detecting, etc. and the function of chemical analysis.

Studies especially on the prevention and diagnosis of diseases are very important among sensors using a microfluidic device. Diagnosis of disease means the detection of a biomaterial specific to the disease, and specifically, the diagnosis means detecting the physical amount caused by a chemical reaction or physical behavior occurring between a target material and enzymes, microorganisms, antibodies, receptors, cells, proteins, DNA, etc. to figure out the information and quantity of the target material. Traditional methods for detecting biomaterials include an electrochemical method, an optical method, a thermal method, a direct mass measuring method, and the like. However, these methods respectively have the problems to be solved, such as weak signal distinctiveness and sensitivity or enlargement of equipment, high cost, long measurement time, etc. Thus, there have been continuous efforts to propose methods that are capable of small and mass production with excellent sensitivity.

As sensors for detecting biomaterials, biochips which have been developed by incorporating sensor active materials and the MEMS (Micro Electro Mechanical System) or NEMS (Nano Electro Mechanical System) technology, which is a Mecca of the present micro processing technology, are recognized as leading candidates. Micro/Nano biochips are technology very suitable to analyze a trace amount of specimens at a super high speed, which mainly include a technology for fixing a biopolymer material selectively and functionally on the surface of chips, and a technology for analyzing a biomaterial combined on the surface of chips.

A diagnosis chip based on a microfluidic device results in the much significant technical development such as mobile phones (which make it possible to develop specimens without external equipment such as pump, etc.) in terms of analysis of specimens. However, there is a need for microfluidic devices with the excellent function of filtering or collecting compounds, inorganic particles, etc. for chemical and biochemical reactions in the fluidic devices.

Meanwhile, as existing membranes, i.e. separation membranes, a Reverse Osmosis (RO) membrane which requires high pressure in the separation of mixtures has played the greatest role. However, in the system that is not able to use high pressure, such as microfluidic devices, the introduction of nano membrane is required. Nano membrane has an advantage of being operated even under the low pressure as compared to the RO membrane and an advantage of having the good resolution of small molecules according to conditions such as size. However, if only the size of nano pores is simply considered, the problem of fouling that several materials in the mixture are adhered to each other, thereby blocking the pores cannot be solved. Thus, taking account of the anti-contaminant function, a more active handling function is required, as well as the size of the pores.

Thus, there is a need for a nanoporous membrane applicable to a microfluidic device with excellent biofouling resistance.

SUMMARY

The object of the invention is to provide a nanoporous membrane applicable to a microfluidic device, with excellent filtering function and biofouling resistance, a preparing method thereof, and a microfluidic device using the same.

The method for preparing a nanoporous membrane according to one aspect of the present invention in order to achieve the object comprises the step of alternatively repeating, on the surface of a porous substrate, the laminating of a hydrophilic homopolymer and the laminating of an amphiphilic block or graft copolymer to provide a polymer multilayer film in which an alternative laminate of the hydrophilic homopolymer and the amphiphilic block or graft copolymer is formed; the step of annealing the polymer multilayer film to form a microphase separated polymeric membrane; and the step of alternatively repeating, on the surface of the polymeric membrane, the laminating of a hydrophilic homopolymer and the laminating of a supramolecular structure compound to form an alternative laminate of the hydrophilic homopolymer and the supramolecular structure compound.

In addition, the method for preparing a nanoporous membrane may further comprise the step of removing the hydrophilic homopolymer from the polymeric membrane to form a pore.

In addition, the alternative laminate of the hydrophilic homopolymer and the amphiphilic block or graft copolymer may be represented by the following general formula 1:

$$(A/B)nBL \qquad \text{[General formula 1]}$$

wherein A represents a layer formed by the laminating of the homopolymer, B represents a layer formed by the laminating of the amphiphilic copolymer, A/B represents repeating unit formed by a bilayer (BL) of A and B, n represents the number of the laminating of the repeating unit bilayer comprised in the alternative laminate, and n is 2 to 100.

In addition, the alterative laminate of the hydrophilic homopolymer and the supramolecular structure compound may be represented by the following general formula 2:

(C/D)nBL                    [General formula 2]

wherein C represents a layer formed by the laminating of the homopolymer, D represents a layer formed by the laminating of cyclodextrin, C/D represents repeating unit formed by a bilayer (BL) of C and D, n represents the number of the laminating of the repeating unit bilayer comprised in the alternative laminate, and n is 2 to 100.

The supramolecular structure compound may be crown ether, cyclodextrin, rotaxan, zeolite, porphyrin, and cucurbituril.

The hydrophilic homopolymer may be one or more selected from the group consisting of polyethylene oxide, polyethylene glycol, poly(acrylic acid) and poly(vinvl alcohol).

The amphiphilic block copolymer may be one or more selected from the group consisting of polyethylene-b-polyethylene oxide (polyethylene-b-polyethylene glycol), polyethylene-b-poly(acrylic acid), polybutadiene-b-polyethylene oxide, polybutadiene-b-poly(acrylic acid), polystyrene-b-polyethylene oxide and polystyrene-b-poly(acrylic acid).

The graft copolymer may be one or more selected from the group consisting of polyethylene-g-poly(acrylic acid), polyethylene-g-polyethylene glycol, polyimide-g-poly (acrylic acid) and polystyrene-g-poly(acrylic acid), where a graft copolymer is bonded to a homopolymer chain, and the group consisting of polyethylene-co-poly(acrylic acid)-g-polyethylene glycol, (polyethylene-co-poly(acrylic acid)-g-polyethylene oxide), polyimide-co-poly(acrylic acid)-g-polyethylene glycol, polystyrene-co-poly(acrylic acid)-g-polyethylene oxide, where a graft copolymer is bonded to one polymer of a copolymerization polymer chain.

The porous substrate may be alumina, silicon wafer or porous polymeric membrane.

Another embodiment of the present invention provides a nanoporous membrane, comprising: a porous substrate; an alternative laminate of a hydrophilic homopolymer and an amphiphilic block or graft copolymer, formed on the surface of the porous substrate; and an alternative laminate of the hydrophilic homopolymer and a supramolecular structure compound, formed on the surface of the alternative laminate of the hydrophilic homopolymer and the amphiphilic block or graft copolymer.

According to one another aspect of the present invention, the present invention provides a microfluidic device comprising the nanoporous membrane. In addition, the microfluidic device may be surface-modified to have the hydrophilic property.

As aforementioned, according to the preparation method of the present invention, a nanoporous membrane with excellent filtering function and bio-fouling resistance can be provided, in which the adjustment of the thickness of the nanoporous membrane is easy. In addition, the nanoporous membrane of the present invention can be prepared on the substrate not only in the thin film form but also in the form being supportable alone, so that the nanoporous membrane can be easily applied for microfluidic devices.

DETAILED DESCRIPTION

The present invention relates to a nanoporous membrane with excellent filtering function and also with excellent biofouling resistance by the formation of nano pores using the self-assembly phenomenon of a polymer material, a preparation method thereof, and a microfluidic device using the same.

Figure 1:
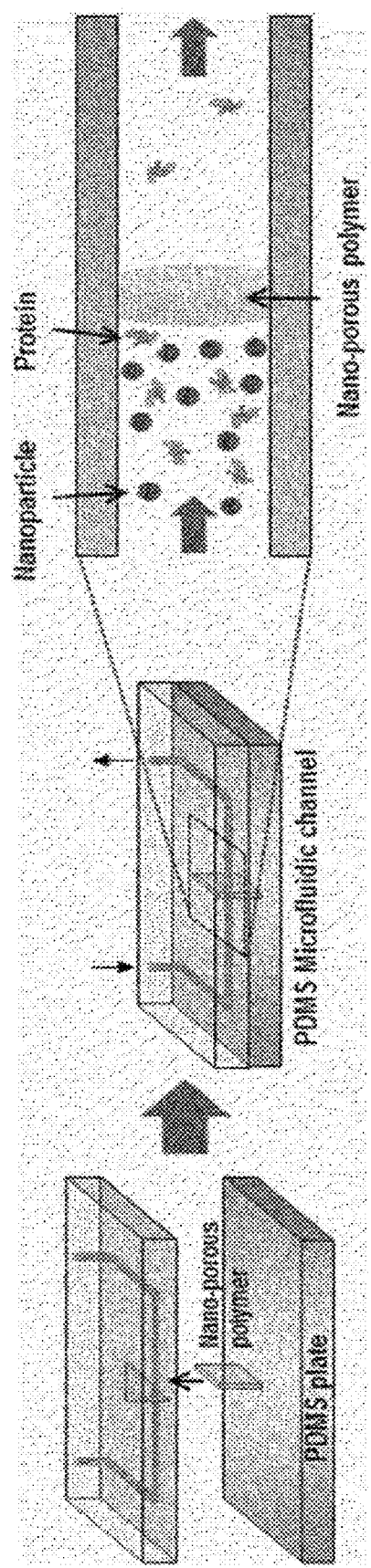
FIG. 1 is the schematic diagram of a microfluidic device embedded with a membrane having a nanoporous membrane.

FIG. 1 illustrates a microfluidic device embedded with a nano membrane according to one embodiment.

In such microfluidic device, a functionalized membrane requires very important properties. First, it is important to prevent the contamination of the membrane surface due to unnecessary materials or biofouling which may cause fetal influence to another reaction. The present invention is characterized by developing a new separation membrane material by synthesizing a supramolecular capable of molecule recognition in the form of polymer (polymer or oligomer) by a specific combination with a molecule having the specific size or a functional group, thereby improving the molecule recognition function. As aforementioned, in case of focusing only on the size of nano scale by laser-etching based on conventional ceramics, the nano membrane cannot exhibit its function due to materials irreversibly adhered to the membrane.

Thus, the polymer materials of the present invention have advantages that it is capable of making films having various thicknesses through an easy wet-process thin film process because the materials are water-soluble, and that nano pores can be formed by a phase separation between polymers or eluting only a specific polymer with an environment-friendly solvent, etc., while avoiding complex or toxic chemical treatment. There is also an advantage that since the film process is easy, the polymer materials can be introduced not only into two-dimensional supporting membranes, but also into the various forms of substrates and three-dimensional substrate surfaces.

One embodiment of the present invention provides, as the method for preparing a nanoporous membrane, a method for preparing a nanoporous membrane, comprising the step of alternatively repeating, on the surface of a porous substrate, the laminating of a hydrophilic homopolymer and the laminating of an amphiphilic block or graft copolymer to form an alternative laminate of the hydrophilic homopolymer and the amphiphilic block or graft copolymer; the step of alternatively repeating, on the surface of the alternative laminate of the hydrophilic homopolymer and the amphiphilic block or graft copolymer, the laminating of a hydrophilic homopolymer and the laminating of a supramolecular structure compound to provide a polymer multilayer film in which an alternative laminate of the hydrophilic homopolymer and the amphiphilic block or graft copolymer is formed; and the step of annealing the polymer multilayer film to form a microphase separated polymeric membrane.

Another embodiment of the present invention provides a method for preparing a nanoporous membrane, comprising the step of alternatively repeating, on the surface of a porous substrate, the laminating of a hydrophilic homopolymer and the laminating of an amphiphilic block or graft copolymer to provide a polymer multilayer film in which an alternative laminate of the hydrophilic homopolymer and the amphiphilic block or graft copolymer is formed; the step of annealing the polymer multilayer film to form a microphase separated polymeric membrane; and the step of alternatively repeating, on the surface of the polymeric membrane, the laminating of a hydrophilic homopolymer and the laminating of a supramolecular structure compound to form an alternative laminate of the hydrophilic homopolymer and the supramolecular structure compound.

One another embodiment of the present invention provides a method for preparing a nanoporous membrane, comprising the step of alternatively repeating, on the surface of the porous substrate, the laminating of a hydrophilic homopolymer and the laminating of a supramolecular structure compound to provide a polymer multilayer film in which an alternative laminate of the hydrophilic homopolymer and the supramolecular structure compound is formed; and the step of annealing the polymer multilayer film to form a microphase separated polymeric membrane.

1. Preparation of a Multilayer Film (S1)

1.1. Hydrophilic Homopolymer

A polymer multilayer film, in which an alternative laminate of a hydrophilic homopolymer and an amphiphilic block or graft copolymer is formed on the surface of a porous substrate, is prepared, and the polymer multilayer film can be obtained by alternatively repeating the laminating of the hydrophilic homopolymer and the laminating of the amphiphilic block or graft copolymer.

The hydrophilic polymer refers to a polymer that is dissolved in polar solvents such as water, etc. because it has polarity or a charged functional group at a main chain or side chain of a polymer chain. The hydrophilic polymer may be crystalline or amorphous polymers. Meanwhile, the homopolymer refers to a polymer obtained by polymerizing one monomer.

As the hydrophilic homopolymers, any one polymer selected from the group consisting of poly(ethylene glycol) (PEG), poly(ethylene oxide) (PEO), poly(acrylic acid) (PAA) and polyvinyl alcohol (PVA) can be preferably used. More preferably, PEO or PAA is used.

1.2. Amphiphilic Block Copolymer

In the present invention, the block copolymer refers to a polymer prepared by copolymerizing two or more monomers, i.e., a polymer comprising two or more blocks having chemically different properties. In addition, the amphiphilic block copolymer refers to a copolymer in which one block of the block copolymer consists of a hydrophobic polymer and the other block consists of a hydrophilic polymer. All copolymers are included in the block copolymer of the present invention, regardless of whether each block is repeated in the main chain constituting the polymer or whether one block constitutes the main chain and the other block is present at the side chain.

The hydrophobic polymer, which is one block constituting the amphiphilic block copolymer, refers to a polymer that is not dissolved in polar solvents such as water, etc. because it does not have polarity or a charged functional group at a main chain or side chain of a polymer chain. Even if the hydrophilic polymer is a crystalline or amorphous polymer with high strength, the hydrophilic polymers can be used without any limitation, if they have sufficient strength as a support of a nanoporous film to be prepared. Preferably, one selected from the group consisting of polyethylene (PE), polypropylene (PP), polystyrene (PS), poly(alkyl (metha)acylate) and polyester can be used. More preferably, PE, PP or PS is used.

The hydrophilic polymer, which is another block constituting the amphiphilic block copolymer, refers to a polymer that is dissolved in polar solvents such as water, etc. because it has polarity or a charged functional group at a main chain or side chain of a polymer chain. The hydrophilic polymer can be a crystalline or amorphous polymer, and any hydrophilic polymers can be used without any limitation, if they have chemically compatibility with the hydrophilic homopolymer laminated together. Herein, compatibility means that as shown in, for example, the following chemical reaction scheme 1, the hydrophilic block of the amphiphilic block copolymer reacts with the hydrophilic homopolymer in the form of a hydrogen bond or an ion bond, so self-assembly is possible. The following reaction scheme 1 just exemplifies polyethylene-b-polyethylene oxide as the amphiphilic block copolymer, and poly(acrylic acid) as the hydrophilic homo-polymer, but the present invention is not limited thereto.

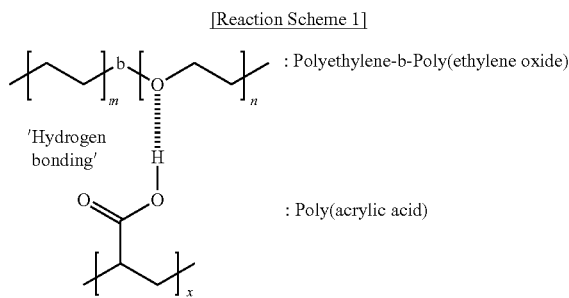

[Reaction Scheme 1]

The hydrophilic polymer may be preferably one or more selected from the group consisting of poly(ethylene oxide) (PEO), poly(ethylene glycol) (PEG), poly(propylene oxide) (PPO), poly(acrylic acid) (PAA) and poly(vinyl alcohol) (PVA). More preferably, one selected from the group consisting of PEO, PEG and poly(acrylic acid) is used.

The amphiphilic block copolymer is preferably one or more selected from the group consisting of polyethylene-b-poly(acrylic acid), polybutadiene-b-polyethylene oxide, polybutadiene-b-poly(acrylic acid), polystyrene-b-polyethylene oxide and polystyrene-b-poly(acrylic acid).

The amphiphilic block copolymer having the composition prepared at the first step of the present invention can be prepared according to the typical preparation method of a block copolymer. Specifically, the amphiphilic block copolymer can be prepared according to an ion polymerization reaction (anion and cation), a radical polymerization reaction including the living form, a charge-transfer polymerization reaction, a graft polymerization reaction using an activity terminal group, and a polymerization reaction method using a macro-initiator.

The weight ratio of a hydrophobic polymer and a hydrophilic polymer constituting the amphiphilic block copolymer can be properly adjusted depending on the strength of the prepared nanoporous film and the size of the pore. The weight ratio of the hydrophobic polymer: the hydrophilic polymer is preferably in the range of 80:20 to 20:80, and more preferably, in the range of 80:20 to 50:50. If the ratio of the hydrophobic polymer does not exceed 20% by weight, the strength of the prepared nanoporous film is not sufficient, and if the ratio exceeds 80% by weight, there is a problem that the pore formed in the nanoporous film is not sufficiently formed only with a hydrophilic polymer.

1.3. Graft Copolymer

In the present invention, the graft copolymer refers to the form where a hydrophilic polymer is graft-polymerized with an amphiphilic copolymer. For example, one or more selected from the group consisting of polyethylene-g-poly(acrylic acid), polyethylene-g-polyethylene glycol, polyimide-g-poly(acrylic acid) and polystyrene-g-poly(acrylic acid), where a graft polymer is bonded to a homopolymer chain, and the group consisting of polyethylene-co-poly(acrylic acid)-g-polyethylene glycol, (polyethylene-co-poly(acrylic acid)-g-polyethylene oxide), polyimide-co-poly(acrylic acid)-g-polyethylene glycol, polystyrene-co-poly(acrylic acid)-g-polyethylene oxide, where a graft polymer is bonded to one polymer of a copolymerization polymer chain, can be used. Preferably, poly(ethylene-co-acrylic acid)-g-poly(ethylene glycol) graft copolymer (PEAA-g-MPEG) can be used, in which hydrophilic poly(ethylene glycol) is bonded to amphiphilic poly(ethylene-co-acrylic acid) (PEAA) by a covalent bond. As shown in Reaction Scheme 2, a complex in the form of a multilayer film can be made by a hydrogen bond of PEG portion and PAA of the graft polymer.

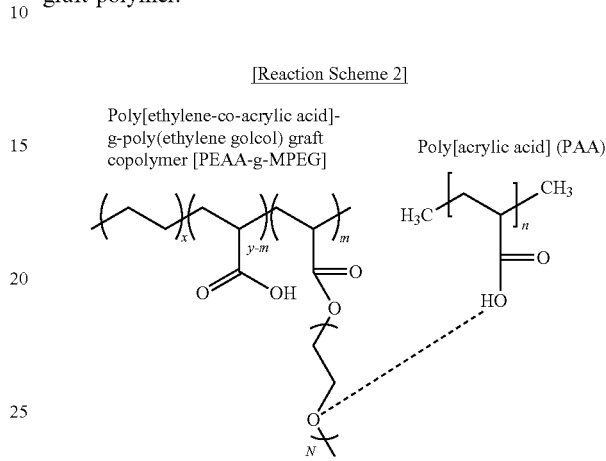

[Reaction Scheme 2]

1.4. Compound with Supramolecular Structure

As compared to the formation of conventional organic low molecule-based supramoleculars, the supramolecular compound in the polymer form of the present invention can be easily prepared with a coating film, so the supramolecular compound can be a new functional material that can utilize the combination with a guest molecule of various molecules on solid surfaces. The molecule combined with the guest molecule is a compound having a cavity, and the combination phenomenon thereof has been studied as supramolecular chemistry. Superemolecule means a molecule complex formed by gathering molecules or ions by a hydrogen bond, an electrostatic interaction or a noncovalent bond such as van der waals attractive force. Since representative noncovalent bonds forming the structure of supramolecules are very weak as compared to covalent bonds, the structure of supramolecular materials can be easily changed depending on the surrounding environment; thus, the shape of materials can be arbitrarily adjusted using this property. The representative principles forming the structure of supramolecules are molecular recognition and self-assembly. Molecular recognition is a result obtained when molecules are structurally fitted to each other, like an antigen-antibody reaction, and this can be deemed to be the relation between a lock and a key. In contrast, self-assembly is the phenomenon that molecules are assembled by a spontaneous interaction, and the supramolecular sieve formed thus is caused by the property of the molecules. When supposed that the ecological supramolecules are further based on molecular recognition, the supramolecular chemistries based on synthesis are more various in the case of being controlled by a self-assembly. Since the range of the supramolecular sieve may be considerably broad, first, the simplest and small unit will be analyzed, which may be molecules based on monomers.

Representative compounds having supramolecular structure includes crown ether, cyclodextrin, rotaxan, zeolite, porphyrin, cucurbituril, and the like.

Preferably, in the present invention, the supramolecular structural compound is cyclodextrin. Cyclodextrin includes alpha-(α-), beta- (β-), gamma (γ-), etc. depending on the size of pores in the center of molecules. Below, the structure of β-cyclodextrin is described in detail.

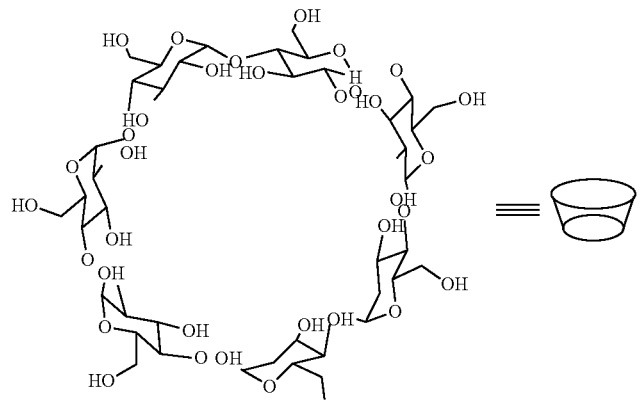 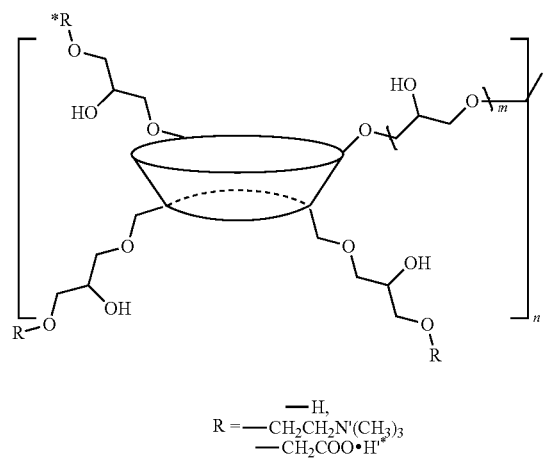

In one embodiment of the present invention, a system being capable of having the functions of collection of specific molecules and thin film assembly by synthesizing a β-cyclodextrin polymer, which has an ion group and a functional group which can be combined with a guest molecule (molecule immersed in the cavity) because it has a cavity, is implemented. According to the present invention, a multi-component & variable function membrane can be prepared, in which a super thin film is formed of polymers (monopolymers or block copolymers) being capable of an ion bond, a hydrogen bond and a covalent bond through a further condensation reaction with supramolecules, and one polymer is removed from the material as needed and ca be replaced with a new molecule which is capable of being combined again with pores. This functional membrane can be used as a separation membrane which is effective in filtering, depending on the size of pores, and furthermore, when targeting a specific molecule and collecting it in pores, the functional membrane can be applied for biosensors or other molecule monitoring systems. For example, the functional membrane can be utilized for collecting specific bioactive materials or separating blood cells in the blood and sensing specific proteins or factors by using it as a coating membrane of biosensors, and this can be utilized to study properties related to vital phenomenon, such as cellular activity according to the morphology change of nanoscale that can be formed together with nano pores, etc. In particular, it is expected that stereospecificity and chirality, which are particularly important in the biochemical phenomenon can be included in the separation membrane, and it is expected that this can be utilized in the studies on huge molecules and super molecules in the collecting process, and also on the studies on the activities of microorganism, such as pharmacopoeia effect, cells and virus, etc. using the separation of isomers.

1.5. Alternative Laminate

Laminating of a multilayer can be performed by a Layer-by-Layer (LbL) process. The LbL process refers to a process for preparing a multilayer laminate by dissolving a polymer to be laminated into a suitable solvent and then applying it on the surface of a substrate and drying the solvent to form one layer, and repeating this process. In case of preparing an alternative laminate by applying a polymer solution which is dissolved in a solvent on the substrate and drying the solution and repeating this process, there is an advantage that a multilayer laminate with a large area and having a constant thickness can be obtained.

Herein, the concentration of the solvent in which the hydrophilic homopolymer or the amphiphilic block or graft copolymer is dissolved, or a polymer solution obtained therefrom can be properly selected. For example, the hydrophilic homopolymer can be dissolved in polar solvents, such as water or alcohol, 1,4-dioxane, tetrahydrofuran, and the amphiphilic block copolymer can be prepared with a polymer solution at a high temperature by using non-polar solvents such as toluene, benzene, hexane, etc. In addition, the amphiphilic graft copolymer can be prepared into a polymer solution by using solvents such as N-methylpyrrolidone (NMP), pyridine (PY), dimethylacetamide (DMAc), etc. In addition, in the case of the supramolecular structure compound, solvents such as water, alcohol, etc. can be used.

In the case of applying the supramolecular structure compound, it is preferable to maintain pH of the solution in which this is dissolved to the proper range, due to ion binding ability according to ionization of an ionized group. For example, the pH may be in the range of pH 2.0 to 8.0, and herein, the solution of the hydrophilic homopolymer preferably has pH in the range of 2.0 to 8.0.

In the present invention, in the laminating of the multilayer, another advantage according to the adoption of the LbL process is that as the multilayer laminate can be prepared with a thin thickness as compared to conventional processes, the stability of a porous thin film produced by etching and the uniformity of nano pores are improved.

In the present invention, in the laminating of the multilayer, one another advantage according to the adoption of the LbL process is that the LbL process can be applied to various forms without any limitation even if the surface of the substrate has a curve, because there is no particular limitation in the shape of the surface of the substrate to be applied by the LbL process.

In the polymer multilayer membrane prepared by using the LbL process, the alternative laminate of the hydrophilic homopolymer and the amphiphilic block or graft copolymer can be represented by the general formula of (A/B)nBL. In the formula, A represents a layer formed by the laminating of the homopolymer, B represents a layer formed by the laminating of the amphiphilic block or graft copolymer, AB represents repeating unit formed by a bilayer (BL) of A and B, and n represents the number of the laminating of the repeating unit bilayer comprised in the alternative laminate. In the embodiment of the preparation method according to the present invention, n is preferably 0 to 100, more preferably, 2 to 80, much more preferably, 5 to 50, and the most preferably, 2 to 20.

n may be an integer; or can be denoted with the number of 'integer+0.5' like 2.5, 3.5 and 4.5. The case where n is denoted with the number that 0.5 is added after integer, for example, the case where n is denoted as $(A/B)_{2.5BL}$ indicates the case where the repeating unit composed of AB is laminated twice and then A layer is further laminated one more, and the outer layers of the laminate are finished with the A layer.

The thickness of the alternative laminate with the aforementioned structure can be adjusted according to the concentration of the polymer solution and the coating thickness and the number of coating.

In addition, the method for preparing a nanoporous membrane according to the present invention is characterized by comprising the step of alternatively repeating, on the surface of the hydrophilic homopolymer and the amphiphilic block or graft copolymer, or on the surface of the porous substrate, the laminating of the hydrophilic homopolymer and the laminating of the amphiphilic block or graft copolymer to provide a polymer multilayer film in which the alternative laminate of the hydrophilic homopolymer and the amphiphilic block or graft copolymer is formed.

In the present invention, the alternative laminate of the hydrophilic homopolymer and the supramolecular structure compound can be represented by the general formula of $(C/D)_{nBL}$. In the formula, C represents a layer formed by the laminating of the homopolymer, D represents a layer formed by the laminating of cyclodextrin, C/D represents repeating unit formed by a bilayer (BL) of C and D, and n represents the number of the laminating of the repeating unit bilayer comprised in the alternative laminate. In the embodiment of the preparation method according to the present invention, n is preferably 0 to 100, more preferably, 2 to 80, much more preferably, 5 to 50, and the most preferably, 2 to 20.

n may be an integer; or can be denoted with the number of 'integer+0.5' like 2.5, 3.5 and 4.5. The case where n is denoted with the number that 0.5 is added after integer, for example, the case where n is denoted as $(C/D)_{2.5BL}$ indicates the case where the repeating unit composed of C/D is laminated twice and then C layer is further laminated one more, and the outer layers of the laminate are finished with the C layer.

The thickness of the alternative laminate with the aforementioned structure can be adjusted according to the concentration of the polymer solution and the coating thickness and the number of coating.

In the case of preparing a polymer multilayer film in which the alternative laminate of the hydrophilic homopolymer and the supramolecular structure compound is formed by alternatively repeating, on the surface of the porous substrate, the laminating of the hydrophilic homopolymer and the laminating of the supramolecular structure compound, this means omitting the step of forming the alternative laminate of the hydrophilic homopolymer and the amphiphilic block or graft copolymer.

In addition, the alternative laminate of the hydrophilic homopolymer and the supramolecular structure compound can be formed before or after the step of forming the microphase separated polymeric membrane, and in case of producing pores in the microphase separated polymeric membrane by the PAA extraction method, the alternative laminate can be introduced thereafter.

1.6. Porous Substrate

At step S1, the porous substrate may be porous alumina or porous polymer membrane. For example, as the porous polymeric membrane, polyvinylidene fluoride (PVDF), polyimidee (PI) and polyethersulfone(PES)-based membranes, etc. can be used. Meanwhile, the porous substrate may be a microfilter membrane, an ultrafilter membrane, a nanofiltration membrane, a reverse osmosis membrane or a forward osmosis membrane, depending on the size of pores present therein.

The porous substrate may have the surface pre-treated by known methods such as plasma treatment and/or primer treatment, for improvement of adhesion with a polymer multilayer membrane to be explained below. For example, when the porous substrate is made of a polymer material, the substrate is plasma-treated according to the known method, so may have a functional group such as —OH on its surface. Meanwhile, in case where the porous substrate is made of a non-porous substrate material such as alumina or silicon wafer, the substrate may have the surface pre-treated with a polymer having a functional group, for example, polymers such as poly(allylamine hydrochloride) (PAH), together with the plasma treatment. The pre-treatment using the polymer having the functional group may be performed through the aforementioned LBL process.

2. Micro-Phase Separation (S2)

The aforementioned block or graft copolymer is a self-assembled polymer. Thus, the produced laminate is annealed, thereby inducing the microphase separation. The annealing is a process for improving the freedom degree of a polymer chain, and this is a process of minimizing the internal stress and realigning the polymer, and thereby self-assembling (microphase separation) the hydrophilic block of the amphiphilic block or graft copolymer into the sphere, cubic, cylinder, gyroid or lamella structure, etc.

The annealing processes include thermal or solvent annealing, etc. In the case of block polymers, the nano structure induced can be adjusted depending on the miscibility between the solvent and the polymer block, and it is preferable to use a solvent annealing method that takes a short time and can prevent the deterioration of the polymer according to the high temperature. The solvents used for this purpose include, for example, toluene, benzene, hexane, tetrahydrofuran, 1,4-dioxane, N-methylpyrrolidone (NMP), pyridine (PY), dimethyl acetamide (DMAc), or mixed solvents thereof.

During the annealing process, as the hydrophilic block of the amphiphilic copolymer is self-assembled, the hydrophilic homopolymer present as a different layer is also realigned. Thereby, the layer formed of the amphiphilic copolymer, which is a part of the polymer multiplayer film prepared at the step S1 has a micro structure while passing through step S2.

The polymer multiplayer film obtained at the step S1 of the present invention is realigned into the micro structure in so-called matrix-domain form, where the amphiphilic copolymer becomes a matrix, and the hydrophilic homopolymer is present as a domain phase. Herein, since the hydrophilic homopolymer presented as a domain phase is hydrophilic, in the amphiphilic copolymer which is present as a matrix phase while surrounding the domain phase, the hydrophilic part of the copolymer is distributed around the domain phase, and the hydrophobic part of the copolymer is located at a distance relatively apart from the domain phase.

Thereby, in the distribution of the hydrophobic polymer and the hydrophilic polymer of the amphiphilic copolymer which is present as a matrix phase, asymmetry occurs.

3. Formation of Pores (S3)

Step S3 is the step of selectively removing the homopolymer from the alternative laminate of the hydrophilic homopolymer and the amphiphilic block or graft copolymer and/or the alternative laminate of the hydrophilic homopolymer and the supramolecular structure compound to form pores. In the present invention, as the method of selectively removing the homopolymer, the method of extracting and removing the homopolymer by using a solvent that selectively dissolves only the hydrophilic polymer, but the present invention is not limited thereto.

In the present invention, as the solvent for removing the hydrophilic homopolymer, solvents with high polarity, such as water, acid aqueous solution or alcohol can be used alone or a combination thereof can be used. For example, PAA can be selectively removed with solvents such as water, ethanol, methanol, acetone, glycerol, acetic acid, pyridine, etc. PEG can be selectively removed with solvents such as water, ethanol, methanol, acetone, glycerol, acetic acid, pyridine, etc. PVA can be selectively removed using water.

In addition, the selective removal of the hydrophilic homopolymer can be carried out at room temperature or carried out at a heated temperature in consideration of the solubility of the polymer, the boiling point of the solvents, the melting points of the polymer adopted, etc.

Meanwhile, it is natural that after the selective removal of the homopolymer, additional processes such as a process of washing or drying the prepared nanoporous film using proper solvents can be carried out.

As such, pores are formed according to the removal of the homopolymer, thereby forming a porous membrane as a whole. The pores formed thus may form a three-dimensional linear channel, thereby passing through in the thickness direction of the membrane, or may form network, thereby passing through the membrane.

In the porous membrane of the present invention, one or more selected from the group consisting of PEO, PEG, PAA and PVA are positioned in a channel, and thus the hydrophilic surface can be expected. Thereby, the porous channel formed of the hydrophilic polymer block functions as allowing hydrophilic materials, for example, water, alcohol, etc. to pass through in the thickness direction of the membrane.

The size of the pores formed of the hydrophilic block can be adjusted by a method according to the molecular weight of the hydrophilic block and the amount when making the blend. The nanopores formed of the hydrophilic block preferably have an average size of 20 to 300 nm. If the size of the nano pores is less than 20 nm, there is a problem that when transmission, a flux is too reduced, and if the size exceeds 300 nm, there is a problem that it cannot exhibit the property of nanofiltration.

In addition, the method for preparing a microfluidic device using the nanoporous membrane prepared according to the preparation method can use typical technologies. Thus, the detailed explanations thereon are omitted in the present specification.

Hereinafter, the present invention will be explained in detail through the examples. These examples are only to exemplify the present invention, and it is obvious to a person having ordinary skill in the art that the scope of the present invention is not limited to these examples.

1. Preparation Examples 1.1. Amphiphilic Block or Graft Copolymer and Hydrophilic Homopolymer The present invention relates to a method of coating a polymer thin film on the surface of an ultra, microfilter membrane, for use as a composite membrane, a nanofilter membrane. For this object, the Layer-by-Layer (LbL) technology was used; in order to form smaller nano pores in the thin film, a block polymer, a graft copolymer and a hydrophilic homopolymer were used; and in order to adjust the hydrophilic property and the size of the pores in the thin film, a β-Cyclodextrin monomer was introduced.

As the block polymer, polyethylene-b-Poly(ethylene oxide) (EEO) was used, which is in the form where the hydrophobic polyethylene and the hydrophilic poly (ethylene oxide) are combined by a covalent bond.

As the graft polymer, Poly(ethylene-co-acrylic acid)-g-poly(ethylene glycol) graft copolymer (PEAA-g-MPEG) was used, which is in the form where hydrophilic Poly (ethylene glycol) is combined to amphiphilic Poly(ethylene-co-acrylic acid) (PEAA) by a covalent bond. The homopolymer used for the formation of the multiplayer thin film together with the above was Poly(acrylic acid)(PAA).

On the multilayer film formed by a hydrogen bond, β-cyclodextrin polymer was introduced into the thin film by an ion bond between β-Cyclodextrin polymer having a cationic charge functional group and PAA.

Two types of the block polymers were used in the examples of the present invention: block polymer EEO1 which has a total molecule weight of 32 k and in which the percentages of the blocks are asymmetrical; and block polymer EEO2 which has a total molecule weight of 26 k and in which the percentages of the blocks are symmetrical. The molecule weight of the graft copolymer was 1700 g/mol, and the configuration percentages were PE(67%), PAA(5%) and PEG(28%). The β-cyclodextrin polymer (CyD) to be introduced was a material synthesized by adding the property of a cation, and the molecule weight was about 3500. As the homopolymer interacting therewith, PAA having the molecule weight of 5700 was used, and in order to improve the adhesion between the polymer thin film and the substrate, Poly(allylamine hydrochloride) (PAH) which is a homopolymer, was used.

All polymers were made into the solution state using proper solvents. According to the property, solubility and the combination principle of the polymers, PAH and CyD were made into solution using deionized water; EEO was made into solution using toluene; and PAA was made into solution using deionized water and 1,4-dioxane as solvents, according to the combining situation. In case of preparing a polymer thin film using the graft polymer, PEAA-g-MPEG and PAA used N-methyl pyrrolidone (NMP) as a solvent. The solvent was prepared at a concentration of 0.01-1 mM, and toluene, 1,4-dioxane and NMP were heated to 80° C. in order to improve the solubility.

1.2. Test Preparation and Pre-Treatment

According to the LbL process, a polymer coating film can be formed on the various forms of surfaces, regardless of the shape or types of substrates, etc. Using the advantage of the LbL process, in the present invention, a polymer coating film was formed on the surface of an alumina membrane prepared as an ultrafiltration membrane.

Figure 2:
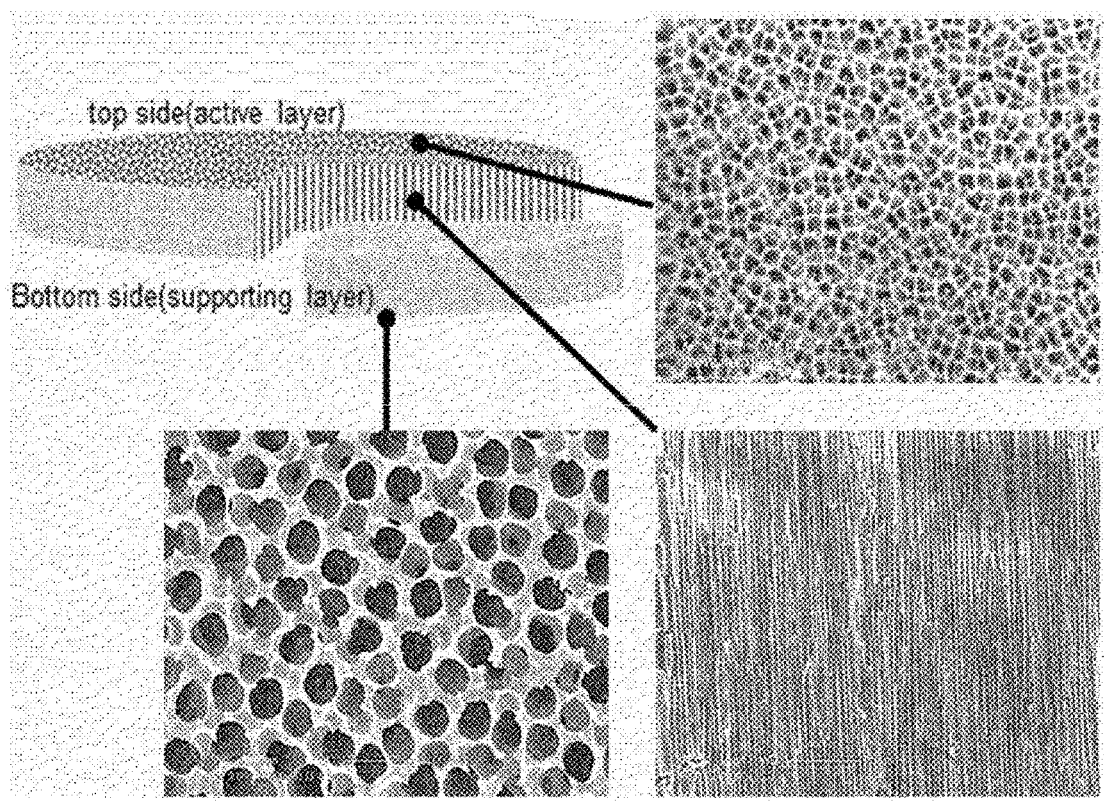
FIG. 2 is the SEM image of the structure, surface and cross section of an alumina membrane.

FIG. 2 is the schematic diagram of the alumina membrane. In the present invention, a disc-shaped alumina membrane, in which a cylinder-shaped pore is present on a support layer and an active layer which determines the separation function of the membrane, has average pore sizes of 0.1 μm and 0.02 μm, was used.

Regarding the types of the substrates, all of the substrates used in the test went through the washing process before the test by the following steps. First, the substrates were immersed into a washing solution made by mixing water and micro soap at a ratio of 100:1, and then washed for about 15 minutes, using an ultrasonic cleaner. Thereafter, the washing solution remaining on the substrates was rinsed and then immersed into deionized water, and washed for 15 minutes three times, and when repeating, the deionized water was changed. The washed substrates were all dried with $N_2$ gas.

After all the washing process and the drying process were finished, the substrates went through the surface-treatment process again. Since the substrates used in the examples had the hydrophobic surfaces, the surfaces were modified into the hydrophilic surfaces by the plasma treatment. Because actively moving electrons and ions exist inside of the plasma, another material can be excited or ionized using them. In the present test, a hydroxyl group (OH) was introduced into the substrate surface by performing the plasma treatment for 3 minutes. The introduction of the hydroxyl group (OH) into the substrate surface first makes the interaction between the substrate and a positive charge of absorbing PAH to be performed well.

1.3. Preparation of Polymer Multilayer Film 1.3.1. Use of Amphiphilic Block Copolymer The preparation of the polymer multilayer film was carried out using the LbL technology. The polymer solution used herein was fixed to a mol concentration of 0.1 mM, and toluene, 1,4-dioxane, NMP and secondary deionized water were used as solvents.

PAH was immersed into the deionized water at the given concentration, and in the case of the block polymer, PAA was dissolved in 1,4-dioxane, and EEO was dissolved in toluene. All solutions were in the concentration of 0.1 mM, and PAA and EEO were stirred at 80° C. to be sufficiently dissolved. In the case of the graft polymer, both PAA and PEAA-g-MPEG were dissolved in NMP, and the concentration and temperature of the solution are the same as those in the case of the block polymer. The dissolved polymer solutions were used in the test without separate purifying process.

The pre-treated substrate was immersed into the prepared polymer solution, so that the dissolved polymer was adsorbed on the substrate surface. As a polymer first absorbed, a polymer which is capable of an interaction with the substrate surface plasma-treated with 02 was selected. Since main polymers constituting the thin film do not have a sufficient adhesion with the substrate, PAH which has a possible charge capable of an interaction with the produced hydroxyl group (OH) was first absorbed as a primer on the substrate surface.

The laminating of the polymer thin film, starting from PAH, is followed by the laminating of PAA having a relative charge, and subsequently by the laminating of EEO. Herein, the interaction using to laminate the thin film is a hydrogen bond of the PEO portion and PAA of the amphiphilic EEO. The substrate which was immersed into the EEO solution and was absorbed after a certain time was alternatively immersed into the solution of PAA and the solution of EEO again to proceed with the laminating using a hydrogen bond.

The substrate which was immersed into the polymer solution was not immersed into another polymer solution immediately, but was through the washing process. The washing process is not only to avoid the contact with an opponent polymer salutation directly interacting, but also to remove a polymer that is extremely absorbed on the substrate surface or is not completely interacted with the absorbed polymer.

1.3.2. Use of Graft Polymer

The polymer multilayer film was prepared in the same manner as mentioned above, except for the use of the PEAA-g-MPEG solution, instead of the EEO solution. Both PAA and PEAA-g-MPEG were dissolved in NMP, and the concentration and temperature of the solution were the same as those in the case of the block polymer. The dissolved polymer solutions were used in the test without separate purifying process.

1.4. CyD Introduction into the Porous Membrane

CyD introduction into the membrane was carried out by using the LbL technology. The polymer solution used herein was fixed to a mol concentration of 0.1 mM, and deionized water was used as solvent.

CyD and PAA were dissolved in the deionized water, and all solutions were stirred with the concentration of 0.1 mM so that they were sufficiently dissolved. The solution having the adjusted pH CyD has pH4.5 and PAA has pH5.5) was used in the test in order to use an ion bond.

The porous membrane formed by a hydrogen bond was immersed into the prepared polymer solution, so that the dissolved polymer was absorbed on the substrate surface. The membrane wherein its outermost layer was made of PAA was immersed in the CyD solution to be absorbed. Herein, the interaction using in order to laminate the thin film is an ion bond between —NH3+ and —COO—. The substrate which was immersed into the CyD solution and was absorbed after a certain time was alternatively immersed into the solution of PAA and the solution of CyD again to proceed with the laminating using the hydrogen bond. The washing process or the indication method were the same as those in the preparation of the polymer block multiplayer film mentioned above.

CyD can be introduced into typical block polymer multilayer membrane formed above, a membrane inducing the microphase separation structure, and a porous membrane prepared by the PAA extraction method, respectively.

1.5. Induction of the Microphase Separation Structure of the Polymer Multilayer Membrane The block polymer system performs the annealing of the polymer using the solvent annealing method, and the mixture of toluene and 1,4-dioxane was used in order to give the chain of the block polymer and the homopolymer the freedom degree.

The graft copolymer system used the thermal annealing method, and it was performed at 60° C. which is near the glass transition temperature of PE and PEG in order to relatively give the chain of the graft copolymer chain the freedom degree.

1.6. Pore Formation

In order to remove PAA, a diluted HCl aqueous solution was used as a solvent. More specifically, a film-shaped specimen was immersed into the container in which the IN HCl aqueous solution was contained for about 4 hours, and then the rinsing process was repeated using deionized water (DI-water) until pH was changed to the unique pH of the deionized water. Thereafter, water remaining in the sample was removed using vacuum oven, thereby obtaining a specimen of the nanoporous film having the property of the filtration membrane.

1.7. Preparation of Microfluidic Device

The microfluidic device was prepared based on poly (dimethyl siloxane)(PDMS), in which Sylgard 184A, which is a monomer, and sylgard 184B, which is a cross linking agent, were mixed with the weight ratio of 9:1 and poured into the prepared silicon mold. A transparent, elastic, rubberic device can be prepared by crosslinking it at 60° C. for 3 hours in the oven.

The microfluidic channel made of PDMS has the hydrophobic surface with its contact angle of 90°, so the flow control using water is difficult. Thus, the surface should be modified into the hydrophilic using polymer coating. The surface was modified by injecting 0.01M PAH and 0.01M PAA into the channel by using a syringe.

The channel intermediate portion of the microfluidic channel made of PDMS was cut in the direction vertical to the channel, and the porous membrane was inserted. Thereafter, the PDMS device with the channel and the flat plate-shaped PDMS were treated with plasma for 3 minutes and then adhered.

Figure 3A:
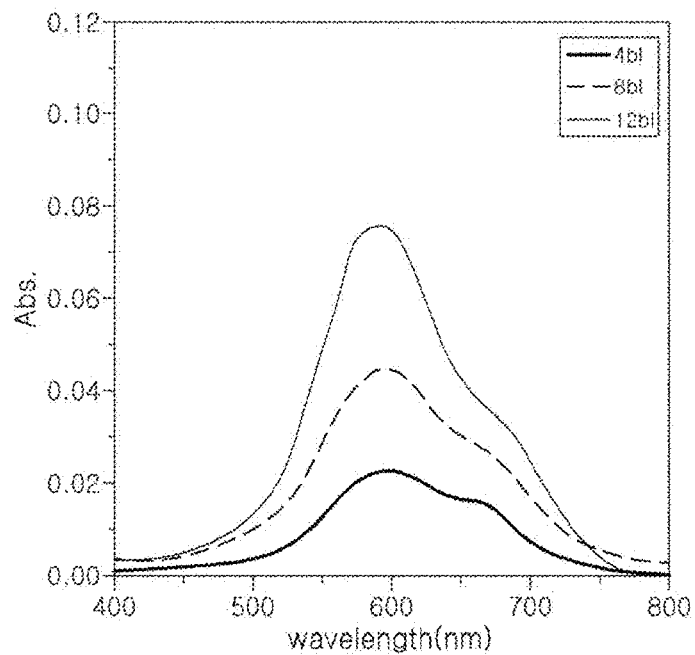
FIGS. 3A and 3B are the graphs showing the change of the absorbance according to the pH condition of PAH(PAA/CyD)n.
Figure 3B:
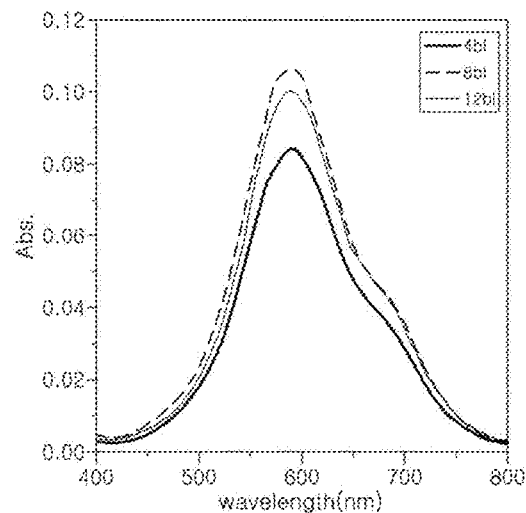

2. Evaluation 2.1. Evaluation of the Property of the Polymer Multilayer Membrane 2.1.1. Property According to the Introduction Cyclodextrin FIGS. 3A and 3B show UV-Vis data measured after the film laminated under the conditions of PAH/(PAA/CyD) was dyed with methylene blue. When LbL laminating, the pH condition of PAA was different, and thereby it was seen that the absorbance was different. Increasing absorbance means that PAA and CyD are introduced in the film in the many amounts. That is, by measuring the absorbance, it can be confirmed that the laminating is performed well.

It is supposed that the high absorbance of B is caused because the interaction between PAA and PAH which were introduced as a primary layer was performed greatly, and considering that the increase of absorbance was not seen according to the increase of the number of the laminating, it can be seen that the laminating is not performed well. A shows the definite increase of absorbance according to the number of bilayers. Thus, it can be considered that the laminating of CyD and PAA is performed well more than that under the B condition. By the adjustment of pH of the respective material, films with different laminated layers are formed. From this, the optimum conditions can be confirmed.

2.1.2. Wettability

A polymer thin film was formed on 20 nm alumina membrane substrate in the same manner as in the preparation example. The composition of the polymer thin film was PAH/(PAA/EEO)n, and the multilayer was formed from 1 bilayer to 9.5 bilayer. Thereafter, the samples form the multiple membranes by introducing CyD from 1 bilayer to 9.5 bilayer on the PAH/(PAA/EEO) thin film by the LbL process. The result measuring the contact angle is shown in FIG. 4.

Figure 4:
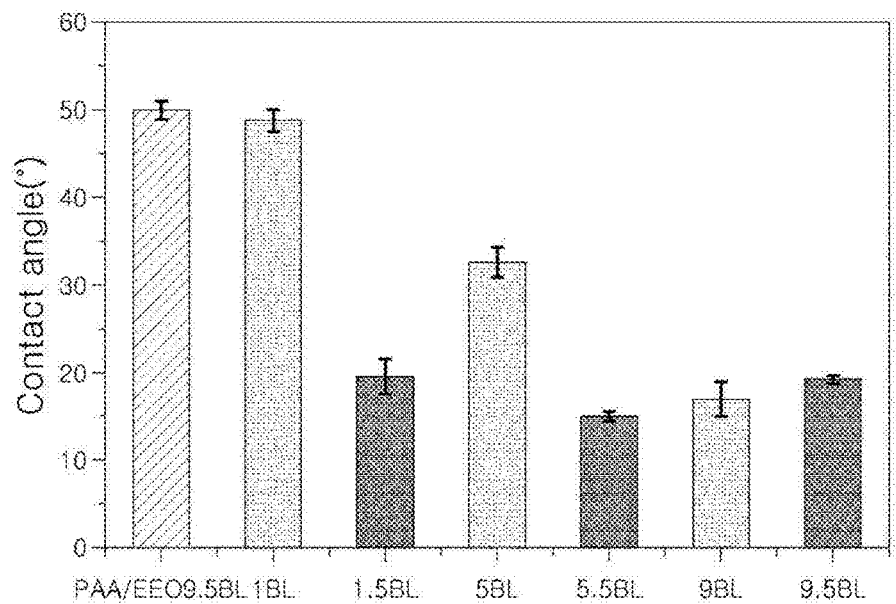
FIG. 4 illustrates the measurement result of the surface contact angle according to the number of the laminating of (CyD/PAA)n.

It was confirmed from FIG. 4 that as the number of the laminating is increased, the contact angle of the multilayer membrane is reduced, and in particular, it was confirmed that the contact angle when CyD is the outermost layer is lower than that when PAA is the outermost layer. It is supposed that due to the property of CyD with the hydrophilic external angle, the larger the amount of CyD introduced on the PAA/EEO film is, the smaller the contact angle is.

2.1.3. Surface Morphology

PAH(PAA/EEO)9.5BL film was formed on the 100 nm alumina membrane using PAA and EEO1 having the molecule weight of 32 k and the asymmetrical property, and then annealed with a solvent, thereby forming pores. The polymer thin film with the induced microphase separation was immersed in the weak acidic solution for 15 minutes, and then PAA in the thin film was selectively removed. It was confirmed from FIG. 5 that the portion where PAA, which was combined with the PEO block, was removed becomes a nano channel, thereby forming a porous membrane.

Figure 5:
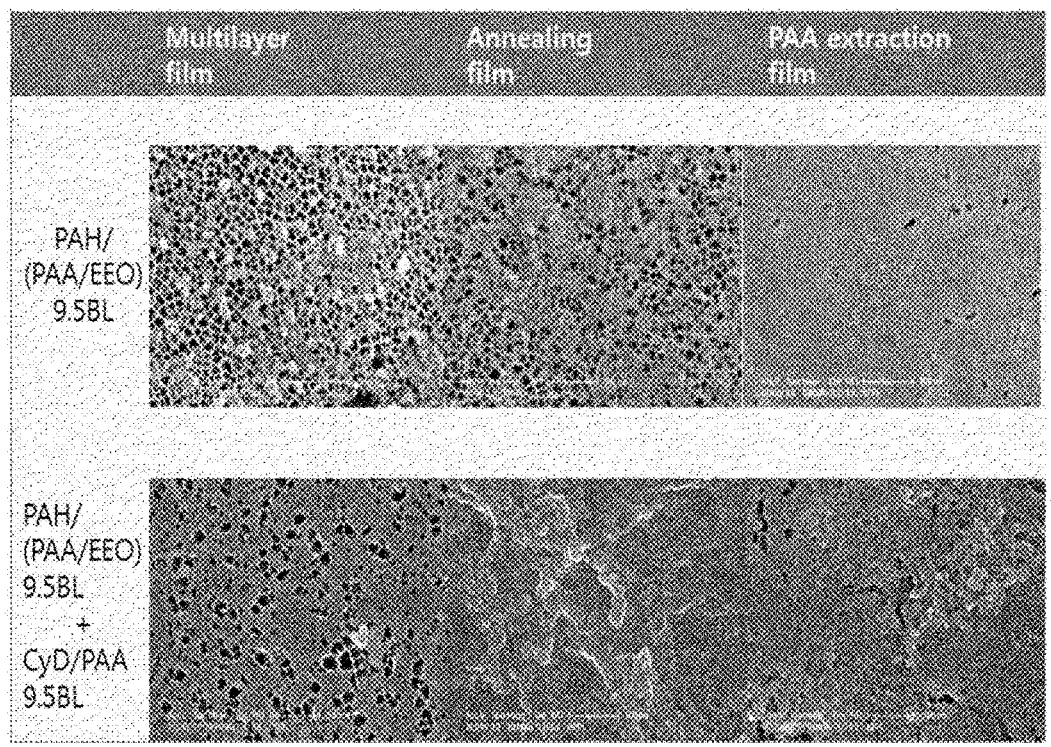
FIG. 5 is the SEM images of PAH/(PAA/EEO)9.5BL multilayer film and multilayer film in which CyD is introduced into the PAHAPAA/EEO)9.5BL multilayer film, in which the microphase separation and PAA elution are performed.

After then, CyD was introduced by the LbL process of CyD and PAA in the film, and it was confirmed that the introduction of CyD was well performed (see FIG. 5). From this, it can be seen that as compared to the polymer thin film consisting only of EEO, when CyD was introduced, the size of the pores is further reduced and the coverage is better.

2.1.4. Flux and Rejection Rate

Figure 6:
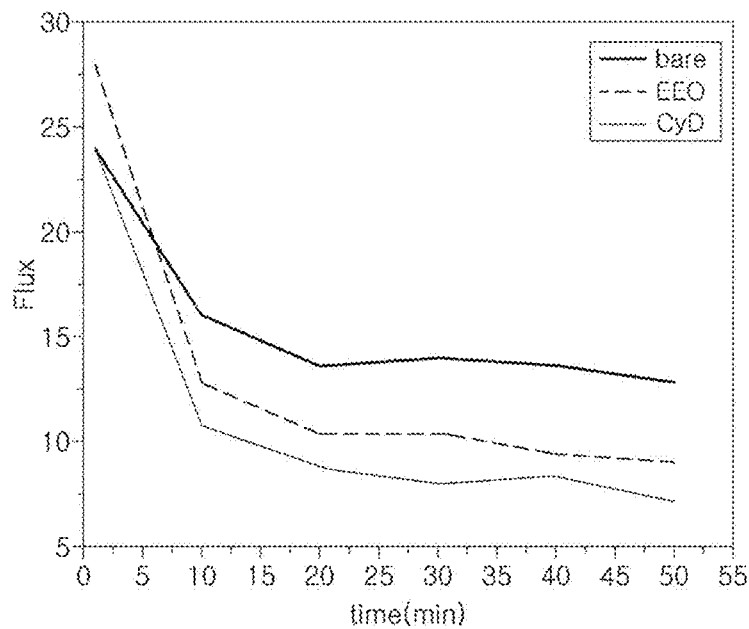
FIG. 6 is the graph measuring the flux of a porous membrane and a porous membrane comprising CyD.

A sample using EE02 having the molecule weight of 26 k, in which the block is symmetrical to PAA having the molecule weight of 5.7 k, and a sample comprising CyD were prepared on 20 nm alumina membrane, and the flux to pure water was measured, and the result is illustrated in FIG. 6. From this result, it can be seen that when passing pure water, the flux value is reduced after coating as compared to before coating. This can be interpreted that the pores of the porous membrane are formed in the size smaller than the UF filter. In addition, when CyD was introduced, the flux was further reduced. It can be interpreted that this is because of the small pores that CyD has. Thus, it can be seen that by introducing CyD into the conventional porous membrane, it is possible to form a membrane with smaller pores.

Figure 8:
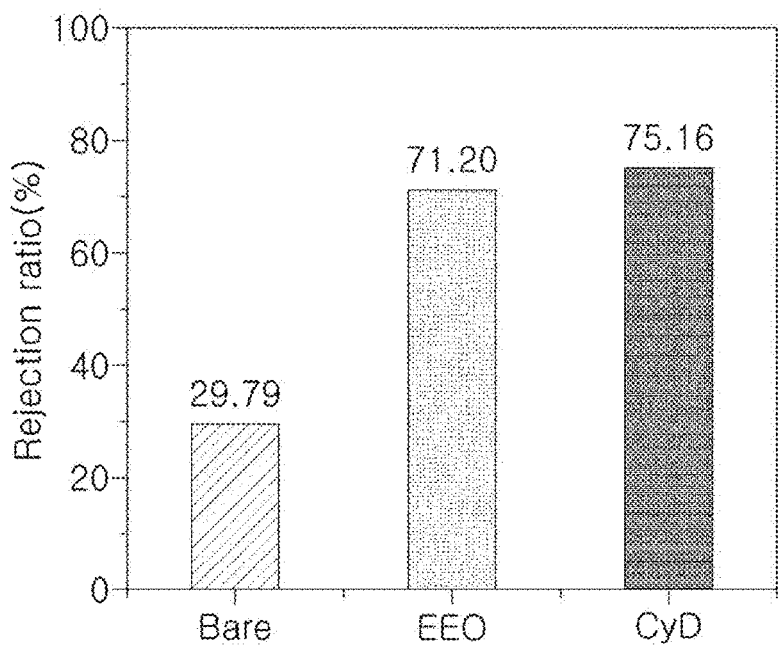
FIG. 8 illustrates the elimination rate in the test using metal nano particles (average 80 nm).

Next, with regard to a membrane in which (CyD/PAA) 5.5BL was further laminated on PAH/(PAA/EEO1)9.5BL and the above sample, the rejection rate was measured by the filtration of metal nano particles (80 nm) which are chloride particulates, and the result is shown in FIG. 8. The separation membrane with pores can filter from colloidal materials to polymer materials and organic materials, depending on the size of the pores, and when using the material whose concentration can be identified, the separation ability and uniformity according to the pore size of the separation membrane can be expected. In the present test, the filtration was carried out using the metal nano particles identifiable by UV-Vis analysis.

The rejection rate of alumina membrane(bare) which is an UF membrane was calculated as about 30%. This is the result that almost of metal nano particles having the size of 80 nm passed through because the pore size of the active layer of the alumina membrane is 0.1 μm. In contrast, as a result of the filtration with the nanoporous membrane formed on the alumina membrane using the polymer, the rejection rate of over 70% was obtained, and it can be seen that in case of laminating CyD thereon, the rejection rate was 75% or more, which is further improved.

Figure 7:
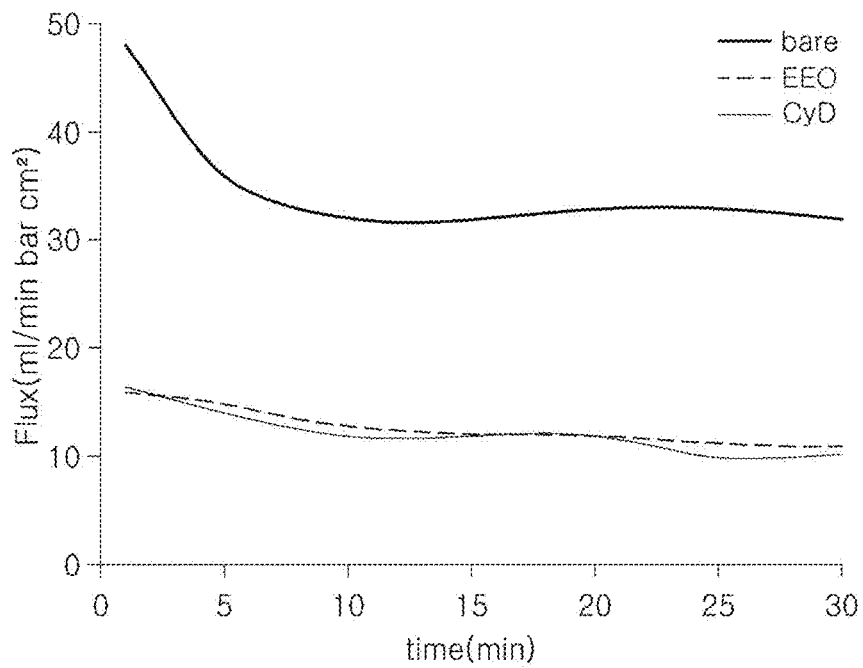
FIG. 7 is the graph measuring the flux in the test using metal nano particles.

The flux value when performing the filtering test of nano particles was significantly high in the case of the aluminal membrane without coating (FIG. 7), and the coated film showed relatively low flux. When comparing the film coated with PAH(PAA/EEO) multilayer membrane and the film further coated with (CyD/PAA) thereon, it can be seen that the flux values have no great differences.

Considering that when the differences between before and after the laminating of (CyD/PAA), the flux values were almost similar, but the rejection rates were increased, it is expected that after the laminating of (CyD/PAA), the size of the pores is reduced, but the flux value is not reduced due to the hydrophilic property of CyD. This means that when making a film into which CyD is introduced, a porous separation membrane with small pores can be formed while not relatively decreasing flux values.

Figure 9:
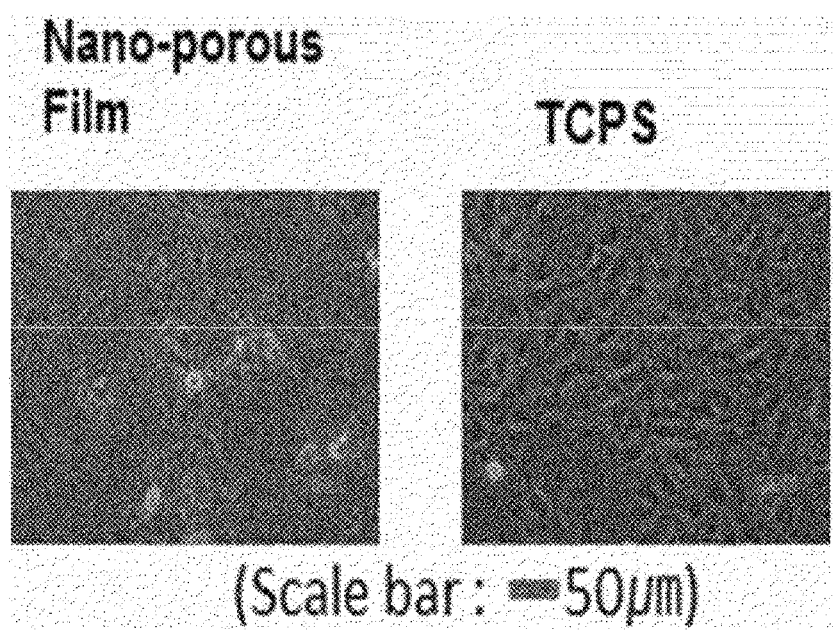
FIG. 9 is the cell abruption image in a coating film and TCPS.
Figure 10:
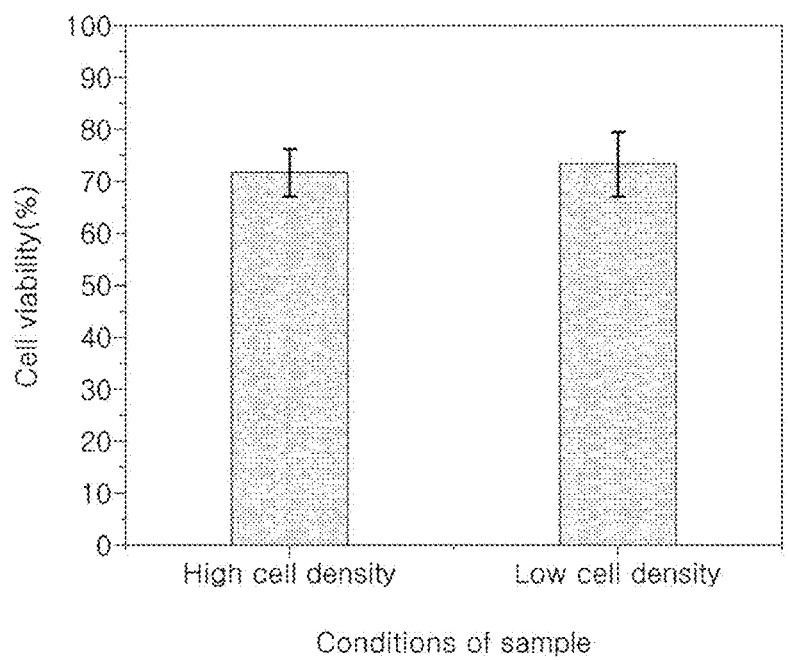
FIG. 10 is the graph showing the cell survival rate in the coating film.

Another advantage of the nanoporous membrane of the present invention is that in the resistance to bio-fouling, the membrane can reduce the absorption of microorganism or genes, which are present in the aqueous phase. FIG. 9 shows that when the nanoporous membrane is coated on the polystyrene surface (left side), the absorption and growth of microorganism can be reduced as compared to the case where the nanoporou membrane is not coated (TCPS). In addition, it shows the property as the eco-friendly, recyclable membrane film, together with the result that the irreversible fouling can be reduced and there is less biological toxicity (see FIG. 10).

2.2. Evaluation of the Property of (PAA/PEAA-g-PEG) nBL Polymer Multilayer Membrane 2.2.1. NMR Analysis Results The NMR analysis result of the PEAA-g-PEG sample formed by the grafting reaction between PEAA and MPEG is shown in FIG. 24.

Figure 16:
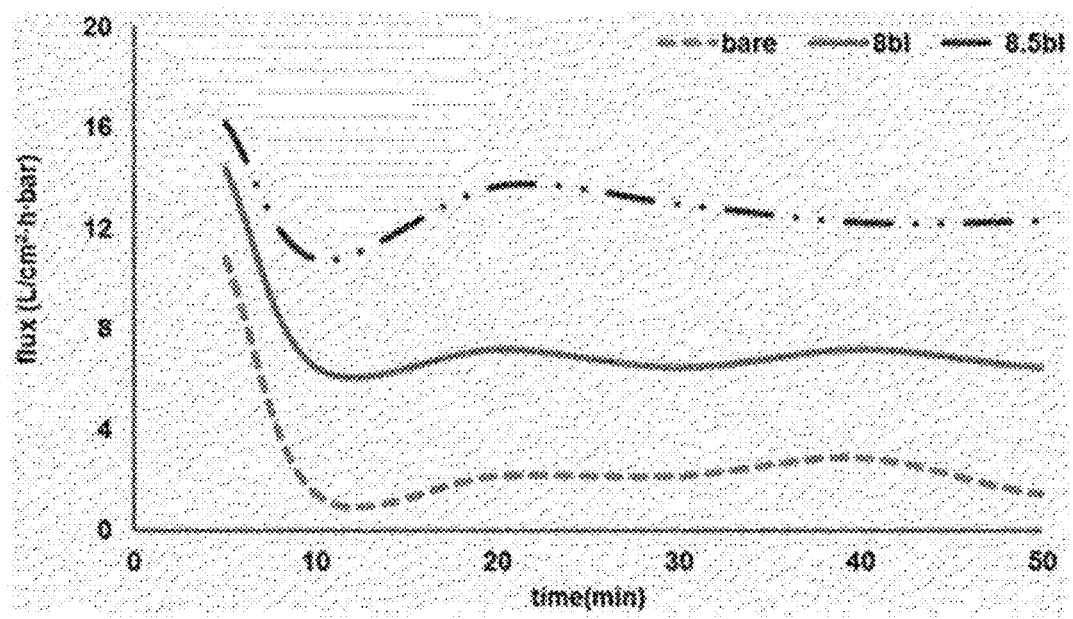
FIG. 16 illustrates the water transmission flux of (PAA/PEAA-g-PEG) multilayer film.
Figure 24:
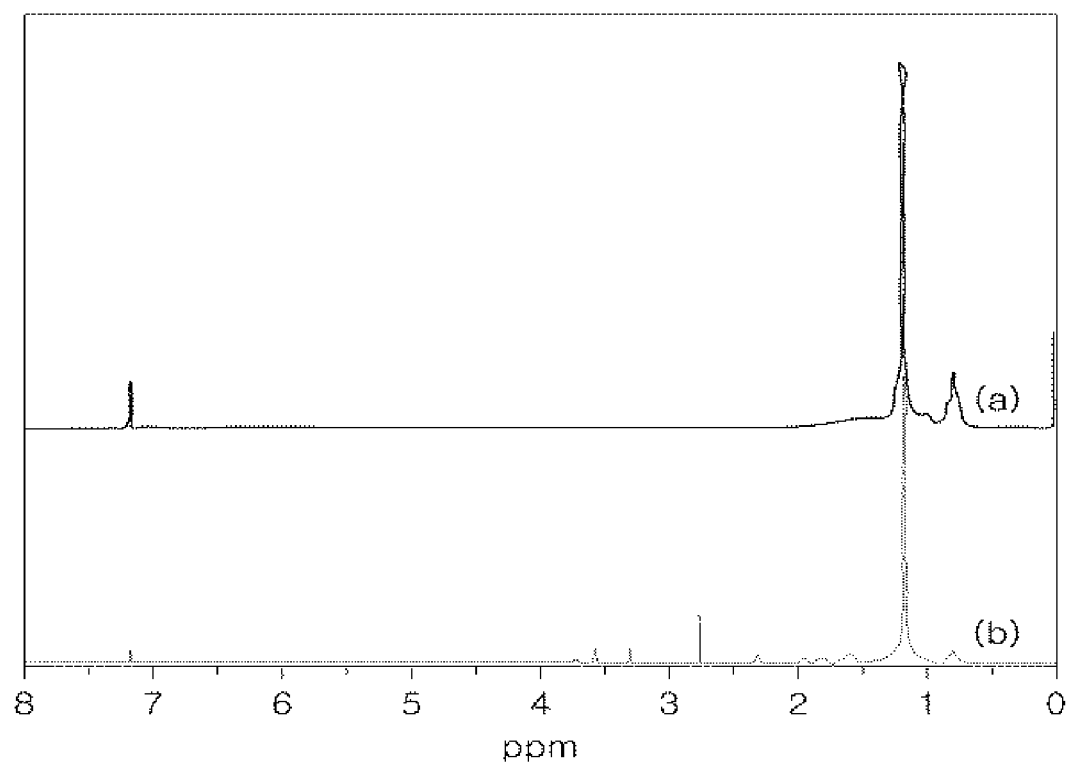
FIG. 24 is the graph showing the result of the PEAA-g-PEG sample formed by the grafting reaction between PEAA and MPEG.

As shown in FIG. 24, it can be seen that about 75% was grafted by the peak analysis of 3 to 4 ppm and 7 ppm the synthesized PEAA-g-PEG sample. It can be seen from FIG. 16 that no peak was observed at 3 to 4 ppm of PEAA, but the peak was observed in PEAA-g-PEG. In addition, considering that the peak is reduced at 7 ppm, it can be seen from FIG. 24 that the graft copolymer was formed by reacting an acrylic acid the conventional PEAA has with MPEG. The percentage of the components of the graft copolymer synthesized by NMR analysis and FT-IR can be confirmed.

2.2.2. Wettability

Figure 11:
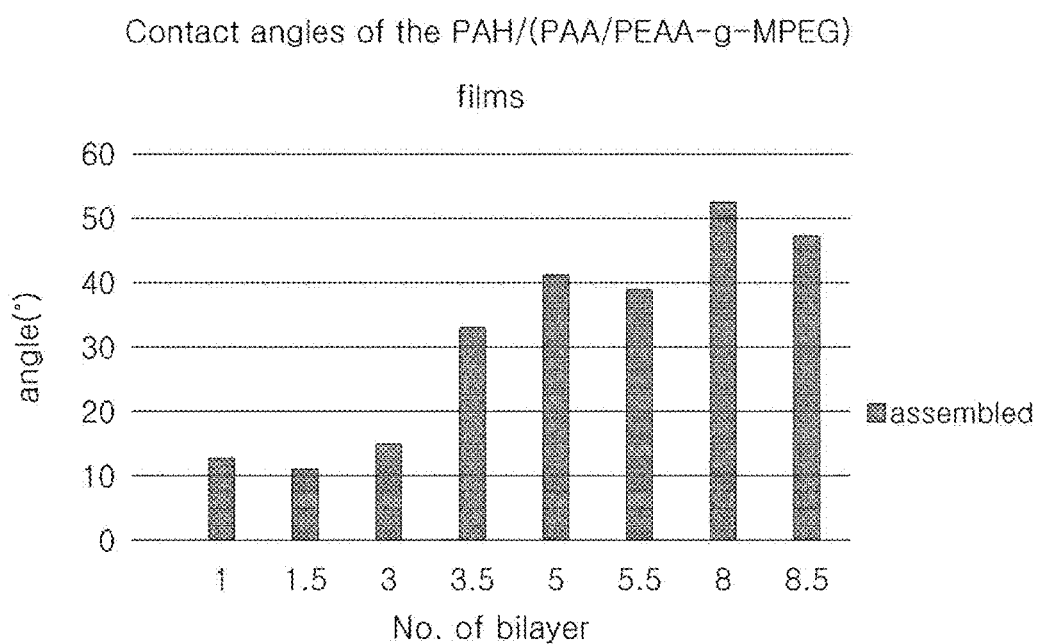
FIG. 11 is the graph showing wettability according to the number of the laminating of PAH(PAA/PEAA-g-MPEG)n film.

The polymer multilayer thin film was formed by using the graft polymer, instead of the block polymer, as demonstrated in the preparation example 1.3.2, and then the contact angle was measured. The result is illustrated in FIG. 11. When measuring the contact angle formed in the multilayer film, at the initial step, the contact angle was significantly low, but as the number of the laminating is increased, the contact angle was increased. It is supposed that the reason was because the hydrophobic PE occupies the considerable portion in the molecule weight of PEAA-g-MPEG which is the used copolymer, and it was formed on the surface in the process of the laminating of the multilayer film.

Figure 12A:
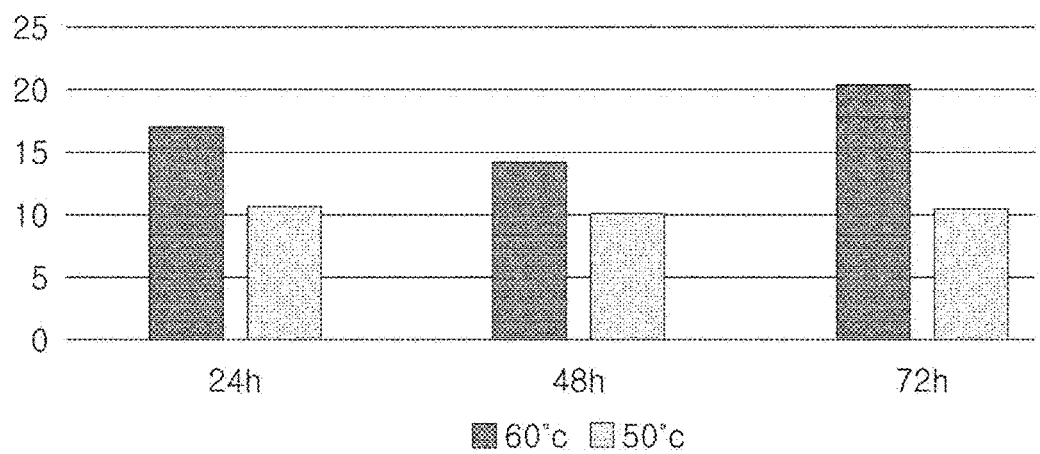
FIGS. 12A and 12B illustrate the change of the contact angle after the thermal annealing of PAH(PAA/PEAA-g-MPEG) 8BL, 8.5BL film.
Figure 12B:
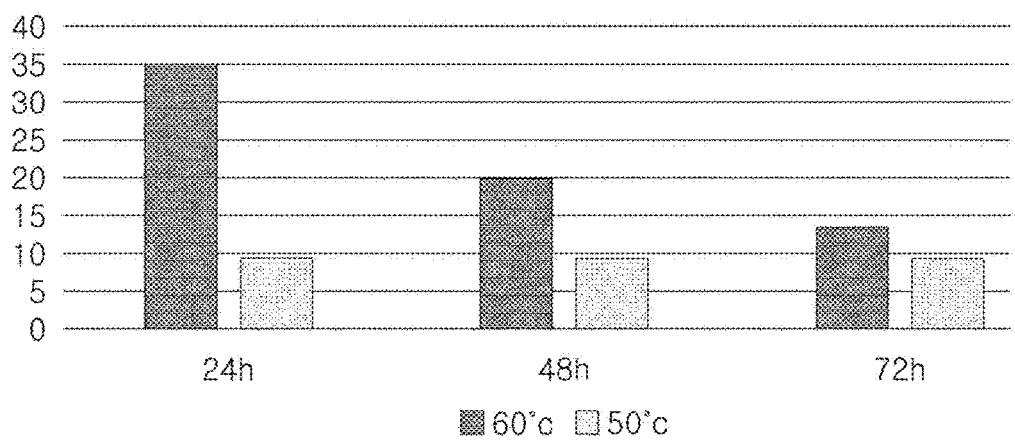

Thus, after the annealing was performed for 24 h, 48 h and 72 h, the contact angles were measured. The result is illustrated in FIGS. 12A and 12B. Herein, in order to expose PEG which is hydrophilic and causes the anti-fouling effect on the surface, the annealing was carried out at the temperatures of 50° C. and 60° C. which are slightly higher than the glass transition temperature of PEG.

As shown in FIGS. 12A and 12 B, it can be observed that after the annealing, the contact angle is remarkably reduced (i.e., it shows the hydrophilic property). When the annealing temperature was 50° C., the contact angle was lower as compared to when the annealing temperature was 60° C. It is supposed that this is because if the temperature is increased, this affects the liquidity in the PE portion, and thus an opportunity that PE is exposed on the surface is higher. The reason why the lower the annealing time is the lower the contact angle is because the liquidity of PEG is increased for a long time, which affects the surface property.

2.2.3. Surface Morphology

Figure 13:
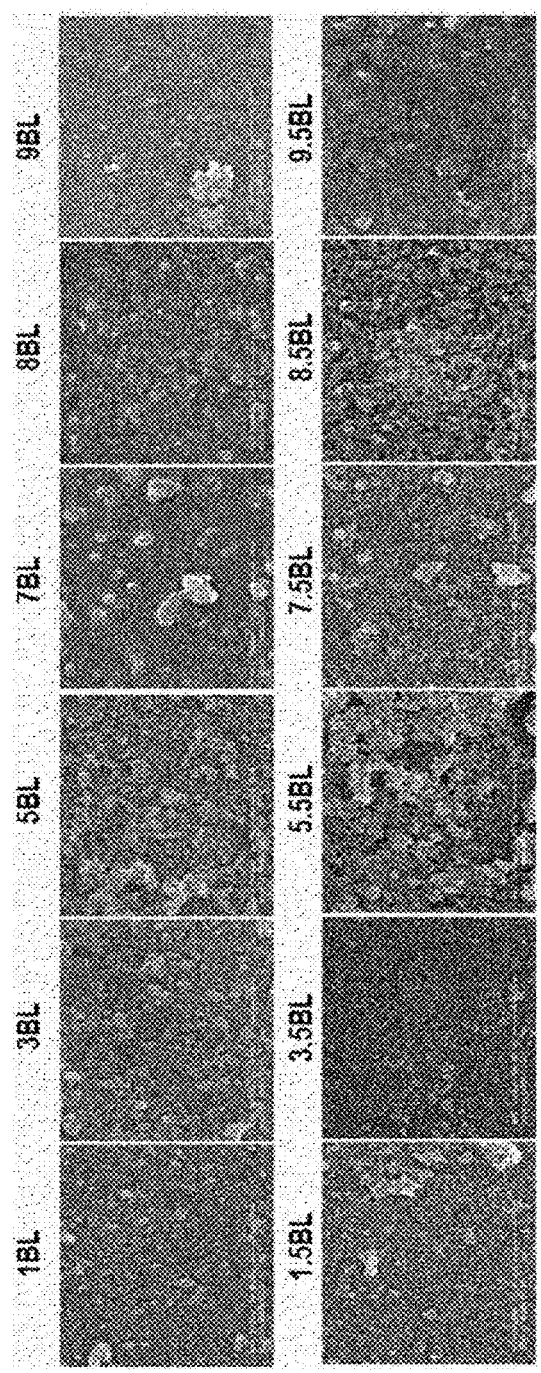
FIG. 13 is the SEM image (100,000 magnifications) according to the number of the laminating of PAH(PAA/PEAA-g-MPEG)n film.
Figure 14:
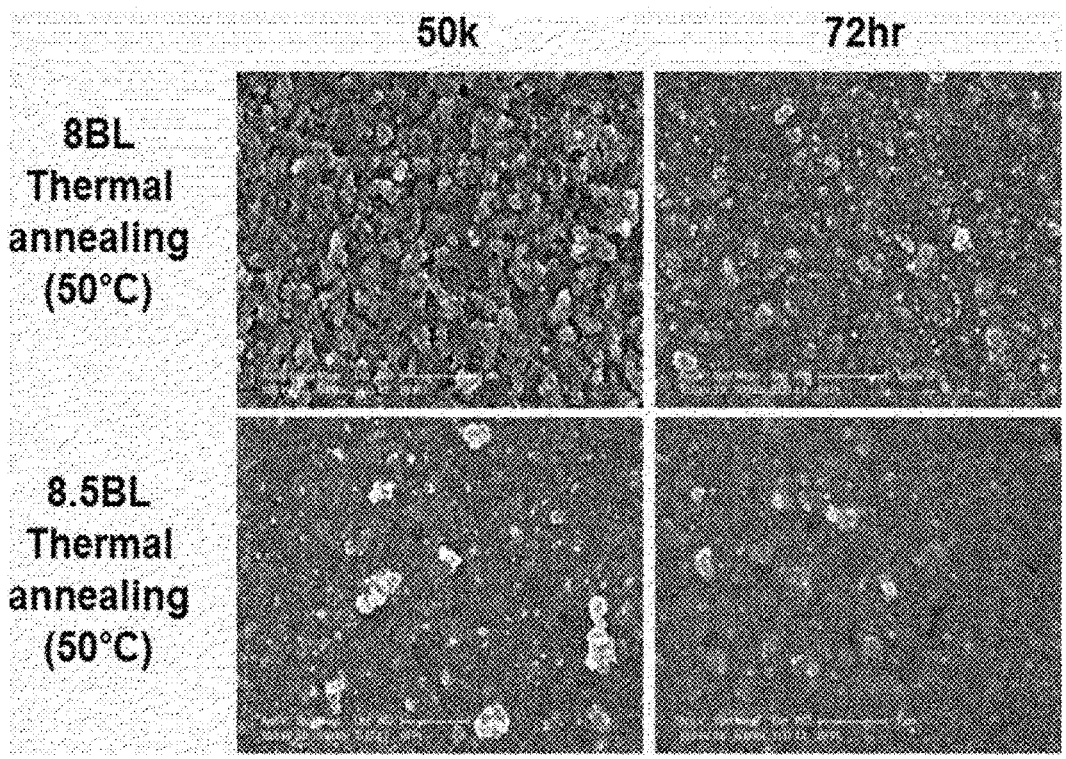
FIG. 14 is the SEM image (100,000 magnifications) after the annealing of 8, 8.5BL film.

In order to figure out whether the laminating of the graft copolymer PEAA-g-MPEG is possible by using PAA and the LbL process, the laminating on the alumina membrane having the 20 nm pore size was carried out. The surface morphology according to the number of the laminating is illustrated in FIG. 13. Considering that as the number of the laminating is increased, the pore size of the membrane surface is reduced, the laminating is possible, and it can be observed that the morphology of the surface is different according to the outermost layer. As shown in FIG. 14, after annealing, a morphology different from the conventional laminated surface can be observed.

2.2.4. Evaluation of Anti-Contamination

Figure 15A:
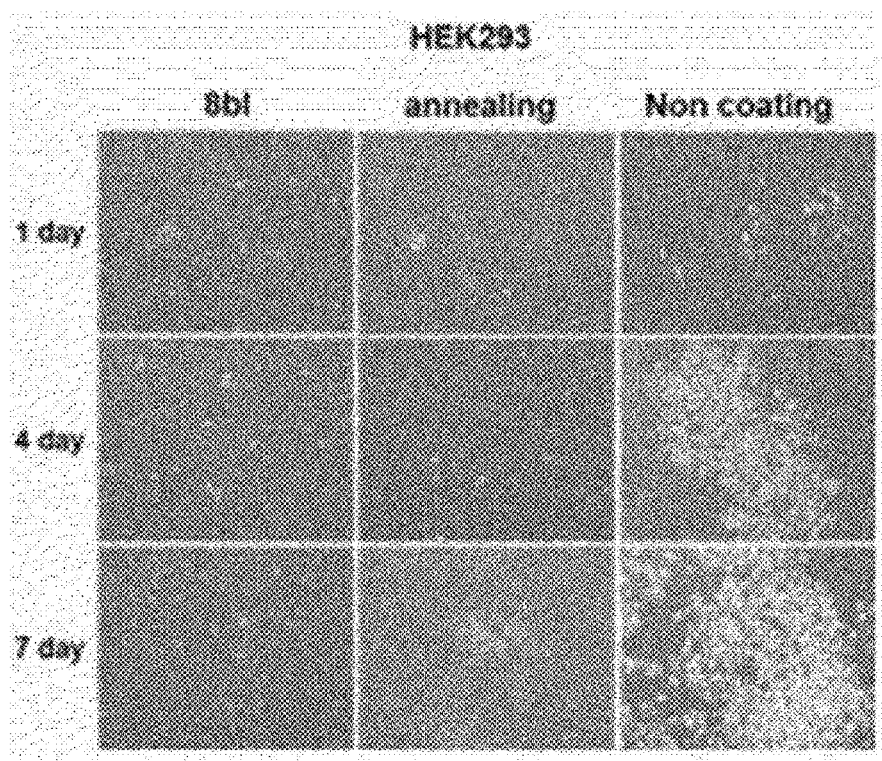
FIGS. 15A and 15B illustrate the results of the anti-pollution evaluation of microorganism of (PAA/PEAA-g-PEG) multilayer film.
Figure 15B:
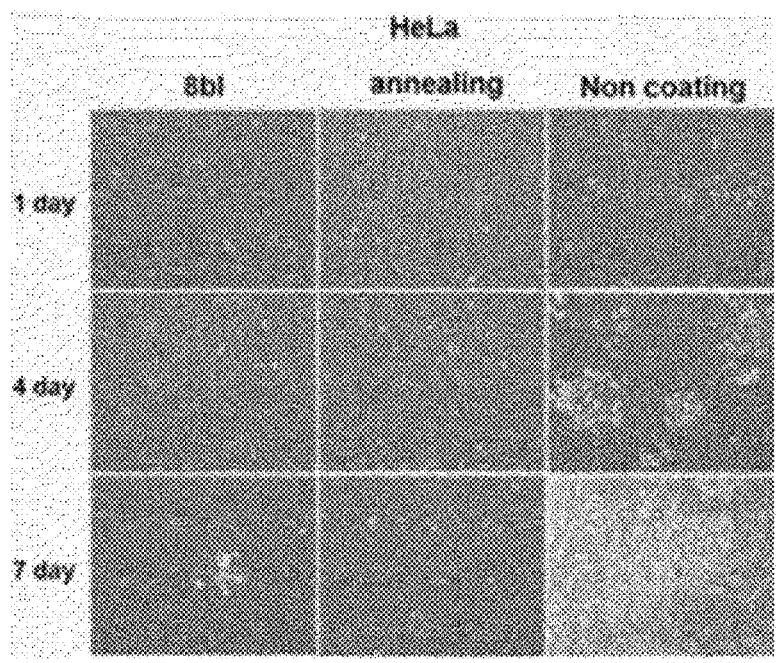

In order to identify whether the prepared polymer multilayer membrane can suppress fouling which is the biggest disadvantage in the nanofiltration membrane, the cell absorption test was performed to identify the anti-fouling phenomenon. In order to observe with an optical microscope, the polymer multilayer was coated on a glass substrate, and then cells were dispensed. In the test, HEK293 cells and HeLa cells were used. Referring to FIGS. 15A and 15B, it can be seen that in the portion where a multiplayer thin film was not formed, the cells were absorbed and dispersed, so the number of cells was increased along the time. In contrast, in the portion where the multiplayer thin film was formed, it can be seen that no cell absorption occurred even along the time, so the number of cells was not increased even 7 days have passed.

This phenomenon occurs as the complex result of the two phenomenon: phenomenon that by the hydrophilic surface modification, the coating membrane prevents the cell absorption while containing water; and phenomenon that the cell absorption is prevented by graft-type PEG formed on the surface of the multiplayer thin film. This phenomenon occurred also after the annealing. Thus, it was confirmed that the (PAA/PEAA-g-PEG) multilayer thin film has an anti-fouling.

2.2.5. Flux Evaluation

In order to observe the change of the flux of the membrane according to the hydrophilic surface modification and the change of the pore size by introducing a polymer blend multilayer membrane into the alumina membrane, the water flux was measured using the Dead-end system. From FIG. 16 which shows the result, it can be seen that as compared to the conventional alumina membrane, when introducing the polymer multilayer membrane, flux was increased. There is a difference in flux between 8BL where the outermost surface is PEAA-g-PEG 8BL and 8.5BL where the outermost surface is PAA. It is supposed that this is because that when the outermost is PAA which is hydrophilic, rather than PEAA-g-PEG which is amphiphilic, wettability of the surface is higher.

2.2.6. Rejection Rate

It was confirmed how much amount the microfluidic device into which the prepared polymer membrane was inserted was filtered by the polymer membrane by allowing the aqueous solution in which the molecular compound was dissolved to flow inside of the channel.

As the compounds, 1 μM of FITC-BSA(7 nm) in which 1 mM of methylene blue (1.5 nm) which is a dying solution, 0.01 wt % of metal nano particles and 0.01 wt % of magnetic nano particles, as shown in the following table. The porous membrane was used, in which unlaminated alumina membrane having 20 nm of the pore size was coated with PAH/(PAA/PEAA-g-MPEG) 9BL polymer coating film, which is a graft copolymer. The solution before being filtered by the membrane, and the solution filtered at the speed of 0.5 ml/h using a syringe pump were compared through absorbance.

| Particles | Conc. | Diameter (nm) |
|---|---|---|
| Methylene blue (MeB) | 1 mM | 1.5 |
| FITC-BSA | 1 μM | 7 |
| Gold Nanoparticle (AuNP) | 0.01 wt % | 60 |
| Magnetic Nanoparticle (MNP) | 0.01 wt % | 100 |

Figure 17:
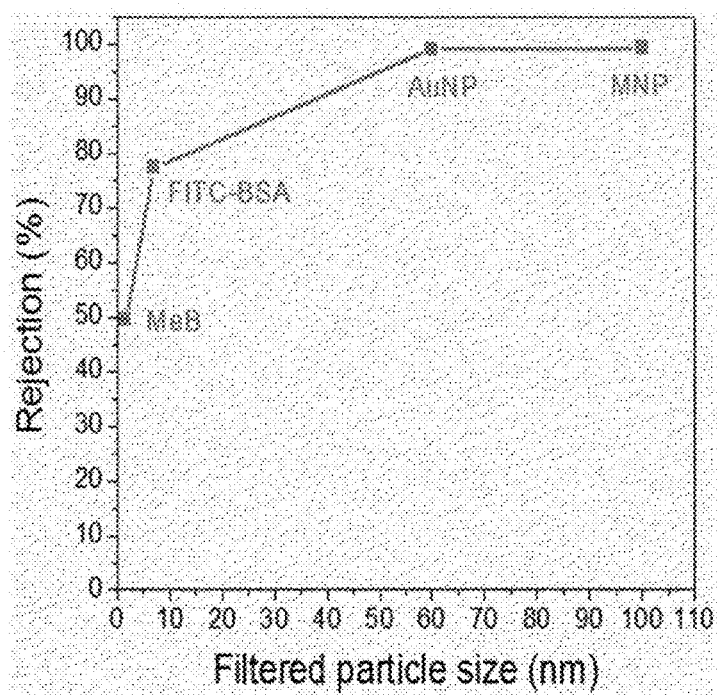
FIG. 17 illustrates the rejection rate of (PAA/PEAA-g-PEG) multilayer film.

The samples were filtered because cut off occurred since the pore size of the nano network porous membrane was 5 to 30 nm. Referring to FIG. 17, almost 100% of the magnetic nano particles and the metal nano particles with large sizes were filtered, and 70 to 80% of FITC-BSA with the similar size were filtered. It was observed that 50% of methylene blue with the very small size was filtered. From the results, it can be seen that since the particles and molecules can be filtered depending on the pore sizes, only the necessary biomolecules were passed through to proceed with the following step.

Figure 18:
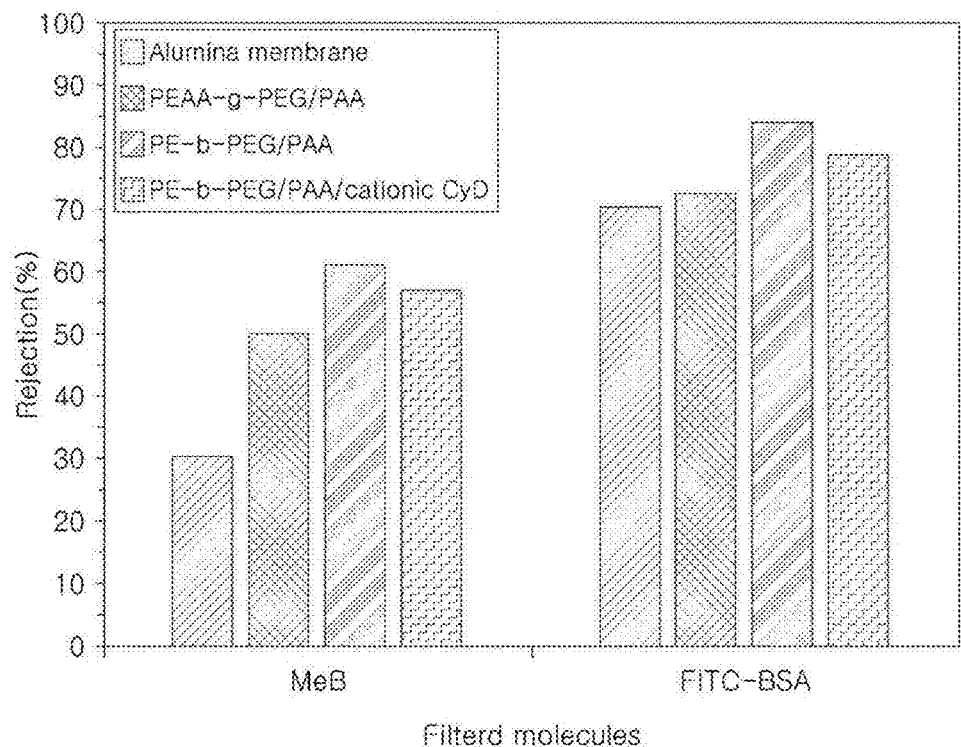
FIG. 18 is the graph showing the filtration degree of a chemical material according to the coating film.

In addition, FIG. 18 shows the results that small molecular samples (protein: FITC-BSA, model drug: MeB), which cannot be completely filtered or collected by the conventional alumina membranes, can be selectively filtered by the coating of the polymer nanoporous membrane. In the case of the membrane film in which cationic CyD which is a supramolecular is comprised, the separation ability is similar to the polymeric membrane, and in particular, the membrane film has the ability to collect stereoisomers which are important in drugs.

2.3. Surface Property of Microfluidic Device

Figure 19:
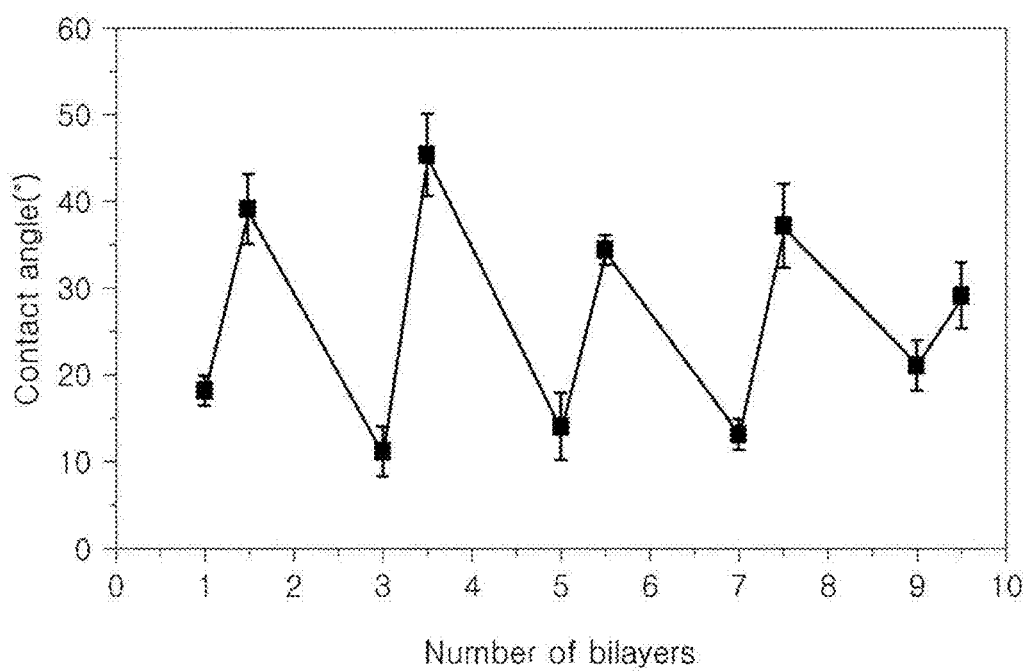
FIG. 19 is the graph showing the measurement of the contact angle for identifying the surface modification of PDMS.

The microfluidic channel made of PDMS has the hydrophobic surface, so the flow control using water is difficult; thus, the surface was modified into the hydrophilic using polymer coating. The substrates PDMS were laminated to 9.5BL under the condition of (PAH/PAA), and the contact angle was measured. The result is illustrated in FIG. 19.

The surface of PDMS having the contact angle of 90° observed the hydrophilic property with the contact angle of 10°-20° when laminating PAA with n layers consisting of the outermost layers, and observed the weak hydrophobic property when laminating PAH with n+0.5 layers consisting of the outermost layers. By the measurement of the contact angle, it was confirmed that the wettability of the surface can be adjusted by the outermost layer of the polymer electrolyte and the number of the laminating, and it was confirmed that when preparing microfluidic channels with PDMS, the inside of the channel was modified into the hydrophilic property, which makes it possible to facilitate the development of fluid or flow adjustment.

Figure 20A:
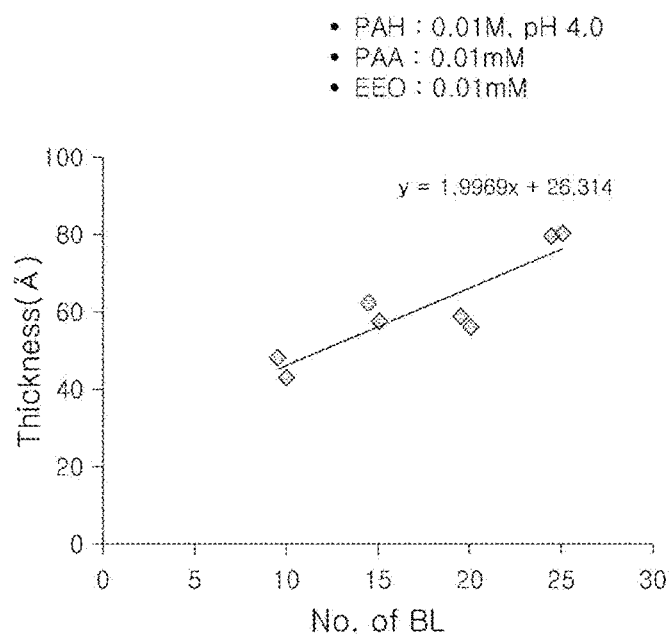
FIGS. 20A and 20B illustrate the result of the measurement of the thickness of the multilayer coating film of PAH/(PAA/EEO) film and PAH/(PAA/CyD) film.
Figure 20B:
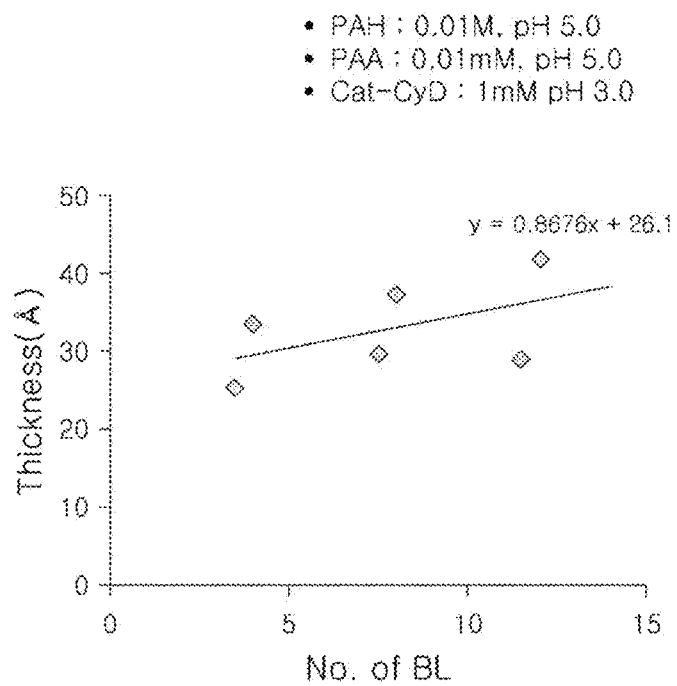

2.4. Property Evaluation of PVDF Membrane—PAA/CyD Multilayer Membrane 2.4.1. Thickness Comparison The increase in the thickness of the multilayer membrane as the number of the laminating of the multilayer thin film is increased was measured by measuring the thickness per Bilayer with ellipsometer. Ellipsometer is capable of analysis using the substrate and the refractive index of the polymer used, and the average value was indicated by several measurements in the same samples. Using ellipsometer, the thicknesses of the thin film in which PAA and EEO were laminated, and the thin film in which PAA and CyD were laminated were analyzed, respectively. As shown in FIGS. 20A and 20B, it was seen that as the LbL process is repeated, the thickness of the thin film is increased.

Referring to the thickness of the thin film in which PAA/CyD were laminated, when the n value was increased, the thickness was not increased as expected, as compared to the initial laminate thickness. It is supposed that this is because, since the molecule weight of CyD is lower than that of the polymer, the laminating by the LbL process is not general.

2.4.2. Surface Morphology

Figure 21:
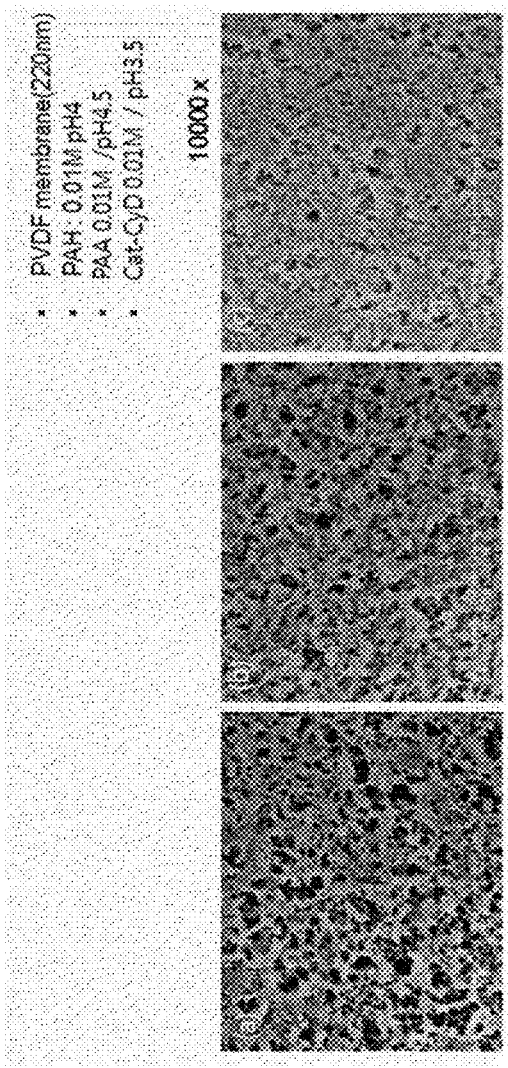
FIG. 21 is the SEM image of PVDF membrane coated with PAA/CyD.

When a multilayer thin film is coated on the porous membrane, the property of the surface can be modified, and the size of the pore can also be adjusted. Thus, by identifying the morphology of the surface, the formation of the multilayer thin film can be figured out and the size of the pore can be identified. In order to identify them, surface morphology was identified using SEM (scanning electron microscopy). FIG. 21 shows the surface identified using SEM after a multiplayer thin film was formed with PAA/CyD on PVDF membrane which is the polymer membrane. It was confirmed that the number of laminating was increased from 3 bilayers to 6 and 9 bilayers, the pore size of the porous membrane was reduced. Thus, it can be seen that by the adjustment of the number of the laminating, the surface morphology such as pore size can be adjusted.

2.4.3. Wettability

Since the separation membrane has pores, when the separation membrane is used as substrate, it observed different wettability as compared to coated on slide glass and silicon wafer. Thus, the wettability of the multilayer thin film coated with the separation membrane was measured.

Figure 22:
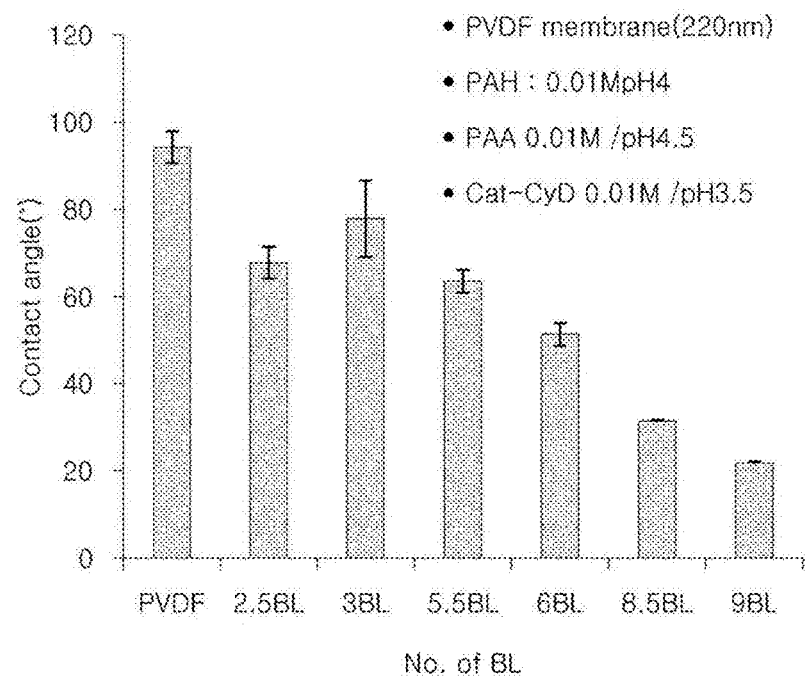
FIG. 22 illustrates wettability according to the number of the laminating of (PAA/CyD).

FIG. 22 shows the graph of the contact angle measured after forming the multilayer thin film on the PVDF membrane. The PVDF membrane is a polymer membrane frequently used as a membrane for water treatment. However, this membrane has a problem in water filtration flux, which is not sufficient to be used for water treatment, because it has the hydrophobic property. Thus, the membrane was made to have a contact angle lower than the conventional contact angle by the surface coating using PAA and CyD, which can be modified into the hydrophilic property. It was observed that as the laminating was progressed, the contact angle was getting lower, so that it was observed that the surface modification into the hydrophilic property was performed well.

2.4.4. Flux Evaluation

Figure 23:
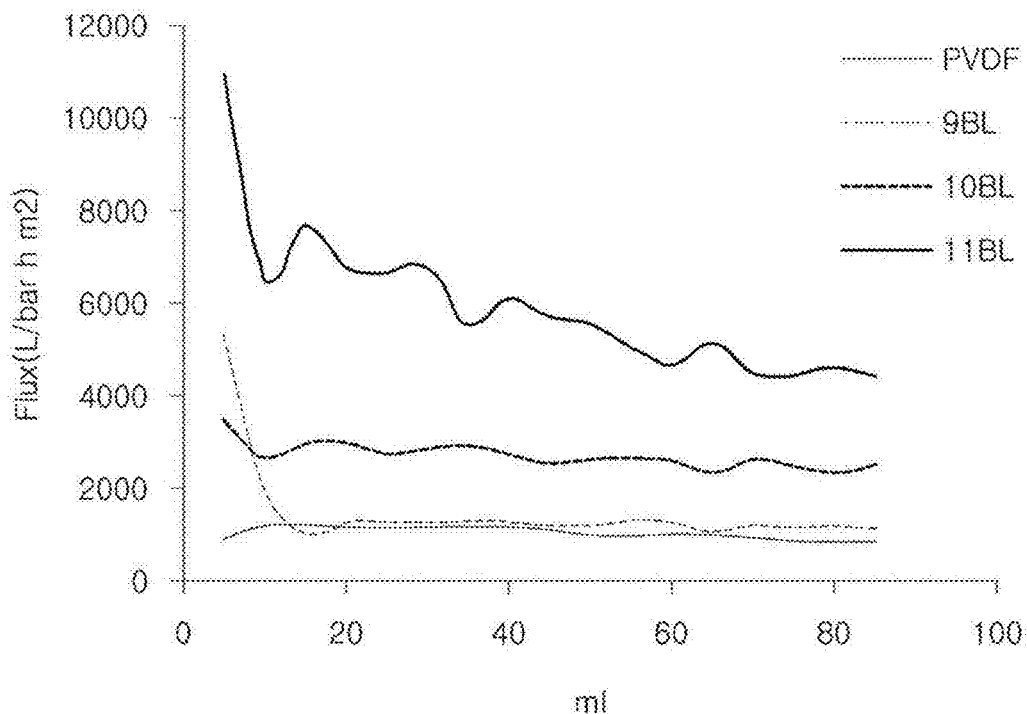
FIG. 23 illustrates the flux of PVDF membrane coated with PAA/CyD.

It was confirmed with the contact angle that the hydrophobic surface of the separation membrane was modified into the hydrophilic surfaced. In order to identify whether the modification of the surface actually affects the flux of the separation membrane, the filter test was performed using Di-water. FIG. 23 shows the graph measuring flux of the multilayer thin film formed with PAA/CyD on the PVDF membrane. It was confirmed that after the formation of the multilayer thin film, the flux became faster than the conventional PVDF membrane. When confirming morphology using SEM, after the formation of the multilayer thin film, the size of the pore was reduced, but the flux was increased. It is supposed that this is because the surface of the separation membrane was modified into the hydrophilic surface after coating.

The present invention is described as above through the preferred examples. A person having ordinary skill in the art to which the present invention pertains can understand that the present invention can be implemented in the modified form within the range that is not beyond the essential characteristic of the present invention. Therefore, the described examples should be considered in the aspect of explanation, not in the aspect of the limitation. The scope of the present application is described in the claims, the aforementioned explanations, and it should be interpreted that all differences within the equivalent scope are included in the present invention.

What is claimed is:

1. A method for preparing a nanoporous membrane, comprising:
   alternatively repeating, on the surface of a porous substrate, the laminating of a hydrophilic homopolymer and the laminating of an amphiphilic graft copolymer to provide a polymer multilayer film in which an alternative laminate of the hydrophilic homopolymer and the amphiphilic graft copolymer is formed;
   annealing the polymer multilayer film to form a microphase separated polymeric membrane; and
   alternatively repeating, on the surface of the polymeric membrane, the laminating of a hydrophilic homopolymer and the laminating of a supramolecular structure compound to form an alternative laminate of the hydrophilic homopolymer and the supramolecular structure compound,
   wherein the amphiphilic graft copolymer refers to a form where a hydrophilic polymer is graft-polymerized with an amphiphilic copolymer; and
   the supramolecular structure compound has an ion group and a functional group which are capable of being combined with a guest molecule, the supramolecular structure has a cavity in which the guest molecule is immersed, and the supramolecular structure compound is selected from the group consisting of crown ether, cyclodextrin, rotaxan, zeolite, porphyrin, cucurbituril and a combination thereof.

2. The method for preparing a nanoporous membrane according to claim 1, further comprising removing the hydrophilic homopolymer from the polymeric membrane to form a pore.

3. The method for preparing a nanoporous membrane according to claim 1, wherein the alternative laminate of the hydrophilic homopolymer and the supramolecular structure compound may be represented by the following general formula 2:

[General formula 2]

wherein C represents a layer formed by the laminating of the homopolymer, D represents a layer formed by the laminating of cyclodextrin, C/D represents repeating unit formed by a bilayer (BL) of C and D, n represents the number of the laminating of the repeating unit bilayer comprised in the alternative laminate, and n is 2 to 100.

4. The method for preparing a nanoporous membrane according to claim 1, wherein the hydrophilic homopolymer is one or more selected from the group consisting of polyethylene oxide, polyethylene glycol, poly(acrylic acid) and polyvinyl alcohol.

5. The method for preparing a nanoporous membrane according to claim 1, wherein the amphiphilic graft copolymer is one or more selected from the group consisting of polyethylene-g-poly(acrylic acid), polyethylene-g-polyethylene glycol, polyimide-g-poly(acrylic acid), polystyrene-g-poly(acrylic acid), polyethylene-co-poly(acrylic acid)-g-polyethylene glycol, (polyethylene-co-poly(acrylic acid)-g-polyethylene oxide), polyimide-co-poly(acrylic acid)-g-polyethylene glycol, polystyrene-co-poly(acrylic acid)-g-polyethylene oxide.

6. The method for preparing a nanoporous membrane according to claim 1, wherein the porous substrate is alumina, silicon wafer or porous polymeric membrane.

7. A nanoporous membrane, comprising:
   a porous substrate;
   an alternative laminate of hydrophilic homopolymers and an amphiphilic graft copolymers, formed on the surface of the porous substrate; and
   an alternative laminate of the hydrophilic homopolymers and supramolecular structure compounds, formed on the surface of the alternative laminate of the hydrophilic homopolymers and the amphiphilic graft copolymers,
   wherein the amphiphilic graft copolymer refers to a form where a hydrophilic polymer is graft-polymerized with an amphiphilic copolymer; and
   the supramolecular structure compound has an ion group and a functional group which are capable of being combined with a guest molecule, the supramolecular structure has a cavity in which the guest molecule is immersed, and the supramolecular structure compound is selected from the group consisting of crown ether, cyclodextrin, rotaxan, zeolite, porphyrin, cucurbituril and a combination thereof.

8. The nanoporous membrane according to claim 7, wherein the hydrophilic homopolymer is one or more selected from the group consisting of polyethylene oxide, polyethylene glycol, poly(acrylic acid) and polyvinyl alcohol.

9. The nanoporous membrane according to claim 7, wherein the amphiphilic graft copolymer is one or more selected from the group consisting of polyethylene-g-poly(acrylic acid), polyethylene-g-polyethylene glycol, polyimide-g-poly(acrylic acid) and polystyrene-g-poly(acrylic acid), where a graft copolymer is bonded to a homopolymer chain, and the group consisting of polyethylene-co-poly(acrylic acid)-g-polyethylene glycol, (polyethylene-co-poly(acrylic acid)-g-polyethylene oxide), polyimide-co-poly(acrylic acid)-g-polyethylene glycol, polystyrene-co-poly(acrylic acid)-g-polyethylene oxide, where a graft copolymer is bonded to one polymer of a copolymerization polymer chain.

10. The nanoporous membrane according to claim 7, wherein the porous substrate is alumina, silicon wafer or porous polymeric membrane.

11. A microfluidic device using the nanoporous membrane according to claim 7.

* * * * *